(12) United States Patent
Lin

(10) Patent No.: US 7,113,704 B1
(45) Date of Patent: Sep. 26, 2006

(54) TUNABLE ADD/DROP NODE FOR OPTICAL NETWORK

(75) Inventor: Wenhua Lin, Pasadena, CA (US)

(73) Assignee: Kotura, Inc., Monterey Park, CA (US)

( * ) Notice: Subject to any disclaimer, the term of this patent is extended or adjusted under 35 U.S.C. 154(b) by 970 days.

(21) Appl. No.: 09/724,179

(22) Filed: Nov. 28, 2000

(51) Int. Cl.
*H04J 14/02* (2006.01)
*H04J 14/00* (2006.01)

(52) U.S. Cl. .............................. 398/83; 398/84; 398/85; 398/48; 398/50

(58) Field of Classification Search ............ 398/83–85, 398/48, 49, 50, 51
See application file for complete search history.

(56) References Cited

U.S. PATENT DOCUMENTS

| | | | |
|---|---|---|---|
| 4,618,210 A | 10/1986 | Kondo | |
| 4,747,654 A | 5/1988 | Yi-Yan | |
| 4,813,757 A | 3/1989 | Sakano et al. | |
| 4,846,542 A | 7/1989 | Okayama | |
| 5,002,350 A | 3/1991 | Dragone | |
| 5,013,113 A | 5/1991 | Soref | |
| 5,039,993 A | 8/1991 | Dragone | |
| 5,243,672 A | 9/1993 | Dragone | |
| 5,412,744 A | 5/1995 | Dragone | |
| 5,450,511 A | 9/1995 | Dragone | |
| 5,467,418 A | 11/1995 | Dragone | |
| 5,581,643 A | 12/1996 | Wu | |
| 5,677,786 A * | 10/1997 | Meli | 359/341.1 |
| 5,706,377 A | 1/1998 | Li | |
| 5,712,932 A * | 1/1998 | Alexander et al. | 385/24 |
| 5,721,796 A * | 2/1998 | de Barros et al. | 385/37 |
| 5,771,112 A * | 6/1998 | Hamel et al. | 398/83 |
| 5,841,931 A | 11/1998 | Foresi et al. | |
| 5,915,051 A * | 6/1999 | Damask et al. | 385/16 |
| 5,917,626 A * | 6/1999 | Lee | 398/88 |
| 5,938,811 A | 8/1999 | Greene | |
| 6,078,418 A * | 6/2000 | Hansen et al. | 398/147 |
| 6,101,012 A * | 8/2000 | Danagher et al. | 398/1 |
| 6,108,478 A | 8/2000 | Harpon et al. | |
| 6,118,909 A | 9/2000 | Chen et al. | |
| 6,122,418 A * | 9/2000 | Ellis | 385/27 |
| 6,256,428 B1 * | 7/2001 | Norwood et al. | 385/17 |
| 6,337,933 B1 * | 1/2002 | Brenner | 385/15 |
| 6,415,082 B1 * | 7/2002 | Wach | 385/39 |

(Continued)

FOREIGN PATENT DOCUMENTS

EP 0647861 A1 4/1995

(Continued)

OTHER PUBLICATIONS

Abe, et al., *Optical Path Length Trimming Technique using Thin Film Heaters for Silica-Based Waveguides on Si*, Electronics Letters, Sep. 12, 1996, vol. 32-No. 19, pp. 1818-1820.

(Continued)

*Primary Examiner*—Jason Chan
*Assistant Examiner*—Nathan Curs
(74) *Attorney, Agent, or Firm*—Gavrilovich, Dodd & Lindsey, LLP

(57) ABSTRACT

An input port of an add/drop node receives a plurality of optical channels. An add/drop port transmits a first drop channel of the plurality of channels when in a first channel mode and a second drop channel of the plurality of optical channels during a second channel mode. When the add/drop node is tuned from the first channel to the second channel, the output port transmits the plurality of channels spectrally located between the first channel and the second channel.

22 Claims, 17 Drawing Sheets

U.S. PATENT DOCUMENTS 6,466,341 B1 * 10/2002 Lumish et al. .................. 398/82
6,594,410 B1 * 7/2003 Kersey et al. .................. 385/15

FOREIGN PATENT DOCUMENTS

| EP | 0985942 A2 | 3/2000 |
|---|---|---|
| JP | 63-197923 | 8/1988 |
| JP | 2-179621 | 7/1990 |
| JP | 6-186598 | 7/1994 |

OTHER PUBLICATIONS

Albert, J., *Planar Fresnel Lens Photoimprinted in a Germanium-Doped Silica Optical Waveguide*, Optics Letters, May 15, 1995, vol. 20-No. 10, pp. 1136-1138.

Aman, M.C., *Calculation of Metal-Clad Ridge-Waveguide (MCRW) Laser Modes by Mode Coupling Technique*, Journal of Lightwave Technology, vol. LT-4, No. 6, Jun. 1986, p. 689-693.

Amann, M.C. et al, *Calculation Of The Effective Refractive-Index Step For The Metal-Cladded-Ridge-Waveguide Laser*, Applied Optics, vol. 20, No. 8, Apr. 15, 1981, p. 1483-1486.

Baba, S. et al., *A Novel Integrated-Twin-Guide (ITG) Optical Switch with a Built-in TIR Region*; IEEE Photonics Technology Letters; vol. 4, No. 5, May 1992, p. 486-488.

Benson, T.M., *Etched-Wall Bent-Guide Structure for Integrated Optics in the III-V Semiconductors*; Journal of Lightwave Technology, vol. LT-2, No. 1, Feb. 1984; p. 31-34.

Berry, G.M. et al., *Analysis Of Multiplayer Semiconductor Rib Waveguides With High Refractive Index Substrates*, Electronics Letters; vol. 29, No. 22; Oct. 28, 1993, p. 1941-1942.

Betty, I. et al., *A Robust, Low-Crosstalk, InGaAsP/InP Total-Internal-Reflection Switch For Optical Cross-Connect Application*.

Burke, S.V., *Spectral Index Method Applied to Coupled Rib Waveguides*; Electronics Letters, vol. 25, No. 9, Apr. 27, 1989, p. 605-606.

Burns, W.K. et al., *Mode Conversion in Planar-Dielectric Separating Waveguides*; IEEE Journal of Quantum Electronics, vol. QE-11, No. 1, Jan. 1975; p. 32-39.

Cai, Y. et al., *A Novel Three-Guide Optical Coupler Using A Taper-Formed Waveguide*; j. Appl. Phys 69(5), Mar. 1991; p. 2810-2814.

Cavailles, J.A. et al., *First Digital Optical Switch Based on InP/GaInAsP Double Heterostructure Waveguides*; Electronics Letters, vol. 27, No. 9, Apr. 25, 1991, p. 699-700.

Chen, R.T. et al., *Design and Manufacturing of WDM Devices*; Proceedings of SPIE vol. 3234.

Clemens, et al., *Wavelength-Adaptable Optical Phased Array in $SiO_2$-Si*, Photonics Technology Letters, Oct. 1995, vol. 7-No. 10, 1040-1041.

Dagli, N. et al., *Analysis of Rib Dielectric Waveguides*; IEEE Journal of Quantum Electronics, vol. QE-21, No. 4, Apr. 1985, p. 315-321.

Dagli, N. et al., *Theoretical and Experimental Study of the Analysis and Modeling of Integrated Optical Components*; IEEE *Journal of Quantrum electronics*, vol. 24, No. 11, Nov. 1988; p. 2215-2226.

Deri, R.J., et al., *Low-Loss GaAs/AlGaAs Waveguide Phase Modulator Using A W- Shaped Index Profile*; Sep. 6, 1988.

Deri, R.J., et al., *Low-Loss Multiple Quantum Well GaInAs/InP Optical Waveguides*; Feb. 21, 1989.

Devaux, F. et al., *20Gbit/s Operation of a High-Efficiency InGaAsP/InGaAsP MQW Electroabsorption Modulator With 1.2-V Drive Voltage*; IEEE Photonics Technology Letters, vol. 5, No. 11, Nov. 1993, p. 1288-1290.

Doerr, C.R. et al., *Chirping Of The Waveguide Grating Router For Free-Spectral-Range Mode Selection In The Multifrequency Laser*, IEEE Photonics Technology Letters, Apr. 1996, vol. 8-No. 4, pp. 500-502.

Doerr, C.R. et al., *Chromatic Focal lane Displacement in the Parabolic Chirped Waveguide Grating Router*, May 1997, vol. 9-No. 5, pp. 625-627.

Dragone, c. *Efficient NxN Star Couplers Using Fourier Optics*, pp. 479-48, Mar. 1989, vol. 7-No. 3, Journal of Lightwave Technology.

Fischer, et al., *Singlemode Optical Switches Based on SOI Waveguides with Large Cross-Section*, Electronics Letters, Mar. 3, 1994, vol. 30-No. 5, pp. 406-408.

Fischer, K. et al, *Sensor Application Of SiON Integrated Optical Waveguides On Silicon*; Elevier Sequoia, 1992; p. 209-213.

Fish, G. et al., *Monolithic InP Optical Crossconnects: 4x4 and Beyond*, JWB2-1, p. 19-21.

Furuta, H. et al, *Novel Optical Waveguide For Integrated Optics*, Applied Optics, vol. 13, No. 2, Feb. 1974, p. 322-326.

Gini, E. et al., *Low Loss Self-Aligned Optical Waveguide Corner Mirrors in InGaAsP/InP*, We P2.22.

Goel, K. et al *Design Considerations for Low Switching Voltage Crossing Channel Switches*; Journal of Lightwave Technology, vol. 6, No. 6, Jun. 1988; p. 881-886.

Granestrand, P. et al., *Integrated Optics 4x4 Switch Matrix with Digital Optical Switches*; Electronics Letters, vol. 26, No. 1, Jan. 4, 1990; p. 4-5.

Himeno, A. et al., *Loss Measurement and Analysis of High-Silica Reflection Bending Optical Waveguides*, Journal of Lightwave Technology, Jan. 1988, vol. 6-No. 1, 41-46.

Hsu, K.Y. et al., *Photonics devices and Modules*, www.cc.nctu.edu.tw/~ctr/lee_mti/research_topic/photonic_devices_modules.htm, pp. 1-3.

Huang, T.C. et al., *Design Edge Translation Waveguide Crossing Optical Switch*; IEEE Photonics Technology Letters; vol. 1, No. 7, Jul. 1989, p. 168-170.

Hutcheson, L.D. et al., *Comparison of Bending Losses in Integrated Optical Circuits*; Optics Letters, vol. 5, No. 6, Jun. 1980, p. 360-362.

Inoue, H. et al, *Low Loss GaAs Optical Waveguides*, Journal of Lightwave Technology, vol. LT-3, No. 6, Dec. 1985; p. 204-209.

Irace, A. et al., *Fast Silicon-on-Silicon Optoelectronic Router Based on a BMFET Device*, Journal of Selected Topics in Quantum Electronics, Jan./Feb. 2000, vol. 6-No. 1, pp. 14-18.

Ito, F. et al., *Carrier-Injection-Type Optical Switch In GaAs With A 1.06-1.55 μm Wavelength Range*; Appl. Physics Letters, 54(2) Jan. 9, 1989; p. 134-136.

Jackman, N. et al., *Optical Cross Connects for Optical Networking*; Bell Labs Technical Journal, Jan.-Mar. 1999; p. 262-281.

Johnston, I.R., et al., *Silicon-Based Fabrication Process For Production Of Optical Waveguides*; IEE Proc-Optoelectron., vol. 143, No. 1, Feb. 1996, p. 37-40.

Kaenko, A. et al., *Athermal Silica-based Arrayed-waveguide Grating (AWG) Multiplexers with New Low Loss Groove Design*; TuO1-1, p. 204-206.

Kasahara, R. et al., *Low-Power Consumption Slica-Based 2x2 Thermooptic Swtich Using Trenched Silicon Substrate*, IEEE Photonics Technology Letters, vol. 11, No. 9, Sep. 1999, p. 1132-1134.

Khan, M.N. et al., *Fabrication-Tolerant, Low-Loss, and High-Speed Digital Optical Swtiches in InGaAsP/InP Quantum Wells*; Proc 21st Eur.Conf.on Opt.Comm.(ECOC '95-Brussels), p. 103-106.

Khan, M.N. et al., *High-Speed Operation of Quantum Well Electron Transfer Digital Optical Switches*; p. 102-102c.

Kirihara, T. et al., *Lossless And Low Crosstalk 4x4 Optical Switch Array*; Electronics And Communications In Japan, Part 2, vol. 77, No. 11.

Kirihara, T. et al., *Lossless and Low-Crosstalk Characteristics in an InP-Based 2x2 Optical Switch*, IEEE Photonics Technology Letters, vol. 5, No. 9 Sep. 1993, p. 1059-1061.

Kokubun, Y. et al., *Athermal Waveguides for Temperature-Independent Lightwave Devices*, Nov. 1993, 1297-1298, vol. 5-No. 11, IEEE Photonics Technology Letters.

Kokubun, Y. et al., *Temperature-Independent Narrowband Optical Filter at 1.3 μm Wavelength by an Athermal Waveguide*, 10th Oct. 1996, vol. 32-No. 21, Electronics Letters.

Kokubun, Y. et al., *Temperature-Independent Optical Filter at 1.55 μm Waveguide Using a Silica-Based Athermal Waveguide*, Feb. 19, 1998, vol. 34-No. 4, Electronics Letters.

Kokubun, Y. et al., *Three-Dimensional Athermal Waveguides for Temperature Independent Lightwave Devices*, Jul. 21, 1994, vol. 30-No. 15, Electronics Letters.

Kostrzewa, C. et al., *Turnable Polymer Optical Add/Drop Filter for Multiwavelength Networks*, Photonics Technology Letters, Nov. 1997, vol. 9-Nov. 11, 1487-1489.

Laakman, K.D. et al., *Waveguides: Characteristic Modes Of Hollow Rectangular Dielectric Waveguides*; Applied Optics, vol. 15, No. 5, May 1976; p. 1334-1340.

Lee, T.P. et al., $Al_xGa_{1-x}As$ *Double-Heterostructure Rib-Waveguide Injection Laser*; IEEE Journal of Quantum Electronics; vol. QE-11, No. 7, Jul. 1975; p. 432-435.

Liu, Y.L. et al., *Silicon 1x2 Digital Optical Switch Using Plasma Dispersion*; Electronics Letters, vol. 30, No. 2, Jan. 20, 1994; p. 130-131.

Mak, G. et al., *High-Speed Bulk InGaAsP-InP Electroabsorption Modulators with Bandwidth in Excess of 20 GHz*, IEEE Photonics Technology Letter, vol. 2, No. 10, Oct. 1990, p. 730-733.

Marcatili, E., *Improved Coupled-Mode Equations for Dielectic Guides*; IEEE Journal of Quantum Electronics, vol. QE-22, No. 6, Jun. 1986; p. 988-993.

Marcatili, E.A.J., *Bends in Optical Dielectric Guides*; The Bell System Technical Journal, Sep. 1969; p. 2103-2132.

Marcatili, E.A.J., *Dielectric Rectangular Waveguide and Directional Coupler for Integrated Optics*, The Bell System Technical Journal, Sep. 1969 p. 207-2101.

Marcatili, E.A.J., *Slab-Coupled Waveguides*; The Bell System Technical Journal, Apr. 1974; American Telephone & Telegraph Company, vol. 53, No. 4, Apr. 1974.

Mirza, A.R. et al, *Silicon Wafer Bonding For MEMS Manufacturing*, Solid State Technology, Aug. 1999, p. 73-78.

Moerman, I. et al., *A Review on Fabrication Technologiesfor the Monolithic Integration of Tapers with III-V Semiconductor Devices*; IEEE Journal of Selected Topics in Quantum electronics, vol. 3, No. 6, Dec. 1997, p. 1308-1320.

Müller, G. et al., *First Low Loss InP/InGaAsP Optical Switch with Integrated Mode Transformers*; ThC12.10; p. 37-40.

Nayyer, J. et al., *Analysis of Reflection-Type Optical Switches with Intersecting Waveguides*, Journal of Lightwave Technology, vol. 6, No. 6, Jun. 1988; p. 1146-1152.

Negami, t. et al., *Guided-Wave Optical Wavelength Demultiplexer Using An Asymmetric Y Junction*; Appl. Phys. Lett. 54 (12), Mar. 20, 1989; p. 1080-1082.

Nelson, W. et al., *Optical Switching Expands Communications-Network Capacity*; Laser Focus World, Jun. 1994, p. 517-520.

Nelson, W.H. et al., *Wavelength-and Polarization-Independent Large Angle InP/InGaAsP Digital Optical Switches with Extinction Ratios Exceeding 20 dB*; IEEE Photonics Technology Letters, vol. 6, No. 11, Nov. 1994; p. 1332-1334.

Noda, Y. et al., *High-Speed Electroabsorption Modulator with Strip-Loaded GaInAsP Planar Waveguide*; Journal of Lightwave Technology, vol. LT-4, No. 10, Oct. 1986, p. 1445-1453.

Offrein, B.J. et al., *Resonant Coupler-Based Tunable Add-After-Drop Filter in Silicon-Oxynitride Technology for WDM Networks*, Journal of Selected Topics in Quantum Electronics, vol. 5-No. 5, 1400-1405.

Okamoto, K. et al., *Arrayed-Waveguide Grating Multiplexer With Flat Spectal Repsonse*; Optics Letters, Jan. 1, 1995; vol. 20, No. 1; p. 43-45.

Okamoto, K. et al., *Flat Spectreal Response Arrayed-Waveguide Grating Multiplexer with Parabolic Waveguide Horns*, Electronics Letters Online, Jul. 15, 1996, No. 19961120, pp. 1661-1662.

Okayama, H. et al., *8x8 Ti:LiNbO₃ Waveguide Digital Optical Switch Matrix*, IEICE Trans. Commun.; vol. E77-B, No. 2; Feb. 1944; p. 204-208.

Okayama, H. et al., *Dynamic Wavelength Selective Add/Drop Node Comprising Tunable Gratings*, Electronics Letters Online, Apr. 10, 1997, No. 19970607.

Okayama, H. et al., *Reduction of Voltage-Length Product for Y-Branch Digital Optical Switch*, Journal of Lightwave Technology, vol. 11, No. 2, Feb. 1993; p. 379-387.

Okuno, M. et al., *Strictly Nonblocking 16x16 Matrix Swtich Using Silica Based Planar Lightwave Circuits*, vol. 10, No. 266, Sep. 11, 1986.

Ooba, N. et al., *Athermal Silica-Based Arrayed-Waveguide Grating Multiplexer Using Bimetal Plate Temperature Compensator*, Electronics Letters, Oct. 12, 2000, vol. 36, No. 21, pp. 1800-1801.

Renaud, M. et al., *Compact Digital Optical Switches for Low Insertion Loss Large Switch Arrays on InP*; Proc. 21st Eur.Conf.on Opt. Comm. (ECOC '95-Brussels), p. 99-102.

Rickman, A.G. et al., *Silicon-on-Insulator Optical Rib Waveguide Loss and Mode Characteristics*, Journal of Lightwave Technology, Oct. 1994, vol. 12-No. 10, pp. 1771-1776.

Rolland, C. et al., *10 Gbit/s, 1.56 μm, Multiquantum Well InP/InGaAsP Mach-Zehnder Optical Modulator*, Electronics Letters, Mar. 4, 1993, vol. 29, No. 5, p. 471-472.

Santec Sales Brochure for year 2000 entitled "Optical Components".

Schauwecker, B. et al, *Small-Size Silicon-Oxynitride AWG Demultiplexer Operating Around 725 nm*, IEEE Photonics Technology Letters, vol. 12 No. 12, Dec. 2000.

Schlachetzki, A. *Monolithic IO-Technology-Modulators and Switches Based on InP*; SPIE vol. 651 Integrated Optical Circuit Engineering III (1986), p. 60-86.

Silberberg, Y. et al., *Digital Optical Switch*; Appl. Phys. Lett.; vol. 51, No. 16, Oct. 19, 1987, p. 152-154.

Smit, M.K., *New Focusing and Dispersive Planar Component Based on an Optical Phased Array*; Electronics Letters; Mar. 31, 1988, vol. 24, No. 7; p. 385-386.

Smith, S.D. et al., *CW Operation of Corner Cavity Semiconductor Lasers*; IEEE Photonics Technology Letters, vol. 5, No. 8, Aug. 1993; p. 876-879.

Sneh, A. et al., *Compact Low Crosstalk and Low Propagation Loss Quantum-Well Y-Branch Switches*; PDP 4-1 ~ 4-5.

Soole, J.B.D. et al., *Use of Multimode Interface Couplers to Broaden the Passband of Wavelength-Dispersive Integrated WDM Filters*; IEEE Photonics Technology Letters, vol. 8, No. 10, Oct. 1996; p. 1340-1342.

Stoll, L. et al., *1.8 Optical Matrix Switch on InP/InGaAsP with Integrated Mode Transformers*; Optical Switches and Modulators II, p. 531-534.

Stoll, L. et al., *Compact and Polarization Independent Optical Swtich on InP/InGaAsP*; TuB7.2; p. 337-340.

Stutius, W. et al, *Silicon Nitride Films On Silicon For Optical Waveguides*; Applied Optics, vol. 16, No. 12, Dec. 1977, p. 303-307.

Sugie, T. et al.,*1.3-μm Laser Diodes with a Butt-jointed Selectively Grown Spot-Size Converter*; ThB2-6, IOOC95, p. 52-53.

Tada, K. et al., *Bipolar Transistor Carrier-Injected Optical Modulator/Switch: Proposal and Analysis*; IEEE Electron Device Letters, vol. EDL-7, No. 11, Nov. 1986, p. 605-606.

Takada, et al., *Optical Spectrum analyzer using Cascaded AWG's with Different Channel Spacings*, Photonics Technology Letters, Jul. 1999, vol. 11, No. 7, pp. 863-864.

Takahashi, H. et al., *Arrayed Waveguide Grating for Wavelength Division Multi/Demultilexer with Nanometre Resolution*, PWG-NTT-7.

Takiguchi, K. et al, *Dispersion Compensation Using a Planar Lightwave Circuit Optical Equalizer*, Photonics Technology Letters, Apr. 1994, vol. 6, No. 4, pp. 561-564.

Tien, P.K. et al., *Formation of Light-Guiding Interconnections in an Integrated Optical Circuit by Composite Tapered-Film Coupling*; Applied Optics, vol. 12, No. 8, Aug. 1973; p. 1909-1916.

Toyoda et al., *Thermoplastic Switch and Wavelength Tunable Filter using Polymer Waveguides*, Abstract of paper presented at Opticomm 2001 on Aug. 22, 2001.

Treyz, G.V. et al., *Silicon Optical Modulators at 1.3 μm Based on Free-Carrier Absorption*; IEEE Electron Device, Letters, vol. 12, No. 6, Jun. 1991; p. 276-278.

Tsuda, H. et al., *Performance Analysis of a Dispersion Compensator Using Arrayed-Waveguide Gratings*, Journal of Lightwave Technology, Aug. 2000, vol. 18-No. 8, pp. 1139-1147.

Tsude, H. et al., *Second- and Third-Order Dispersion Comensator Using a High-Resolution Arrayed Waveguide Grating*, IEEE Photonics Technology Letters, May 1999, vol. 11-No. 5, 569-571.

Vinvchant et al, *InP 4x4 Digital-Optical-Switch Module For Multiwavelength Cross-Connect Applications*; OFC '95 Technical Digest, Thursday ThK2, p. 281-282.

Vinchant, J.F. et al., *First Polarisation insensitive 4x4 Switch matrix on InP with Digital Optical Switches*, TuB7.3, p. 341-344.

Vinchant, J.F. et al., *InP Digital Optical Swtich: Key Element for Guided-Wave Photonic Switching*, IEE Proceedings-J, vol. 140, No. 5, Oct. 1993; p. 301-307.

Vinchant, J.F. et al., *Low Driving Voltage or Current Digital Optical Switch on InP for Multiwavelength System Applications*; Electronics Letters, vol. 28, No. 12, Jun. 4, 1992; p. 1135-1137.

Wakita, K. et al., *Long Wavelength Waveguide Multiple Quantum Well Optical Modulators*; IEEE Journal of Quantum Electronics, vol. QE-23, No. 12, Dec. 1987, p. 2210-2215.

Wanru, Z. et al., *Total Internal Reflection Optical Switch with Injection Region Isolated by Oxygen Ion Implantation*; p. 1-10.

Yamada, et al., *Cross Talk Reduction in a 10 GHAz Spacing Arrayed-Waveguide Grating by Phase-Error Compensation*, Journal of Lightwave Technology, Mar. 1998, vol. 16-No. 3, pp. 364-371.

Yanagawa, H. et al., *Polarization-and Wavelength-Insensitive Guided-Wave Optical Swtich with Semiconductor Y Junction*; Journal of Lightwave Technology, vol. 8, No. 8, Aug. 1990, p. 1192-1197.

Yu, S. et al., *High Speed All-Optical Packet Routing Using A Vertical Coupler Crosspoint Space Switch*.

Yu, S. et al., *Ultralow Cross-Talk, compact integrated optical crosspoint space switch arrays employing active InGaAsP/InP Vertical Waveguide Couplers*, Integrated Optical Crosspoint Switch Arrays, Siyuan Yu et a, CPD24-2.

Zengerle, R. et al., *Tapered Twin Waveguides For Spot-Size Transformation In InP*; TheB2-5; IOOC 95; p. 50-51.

Zirngibl, M. et al., *Digitally Tunable Laser Based On The Integration Of A Waveguide Grating Multiplexer And An Optical Amplifier*, IEEE Photonics Technology Letters, Apr. 1994, vol. 6-No. 4, pp. 516-517.

Zucker, J.E. et al., *Strained Quantum Wells for Polarization-Independent Electrooptic Waveguide Switches*, Journal of Lightwave Technology, vol. 10, No. 12, Dec. 1992, p. 1926-1930.

H. Okayama et al., *Dynamic Wavelength Selective Add/Drop Node Comprising Tunable Gratings*, 2 pgs.

2000 Optical Components , Santec Corporation, 4 pgs.

\* cited by examiner

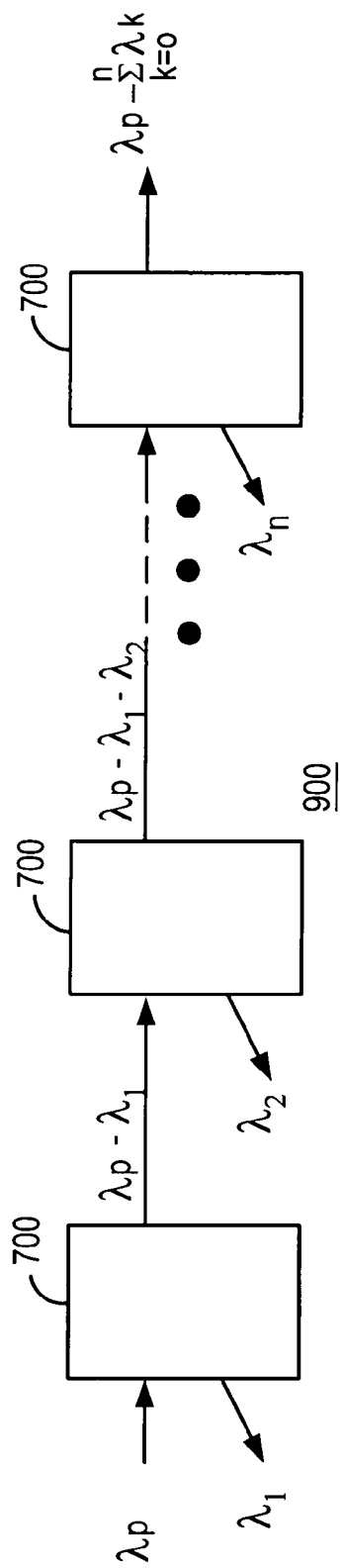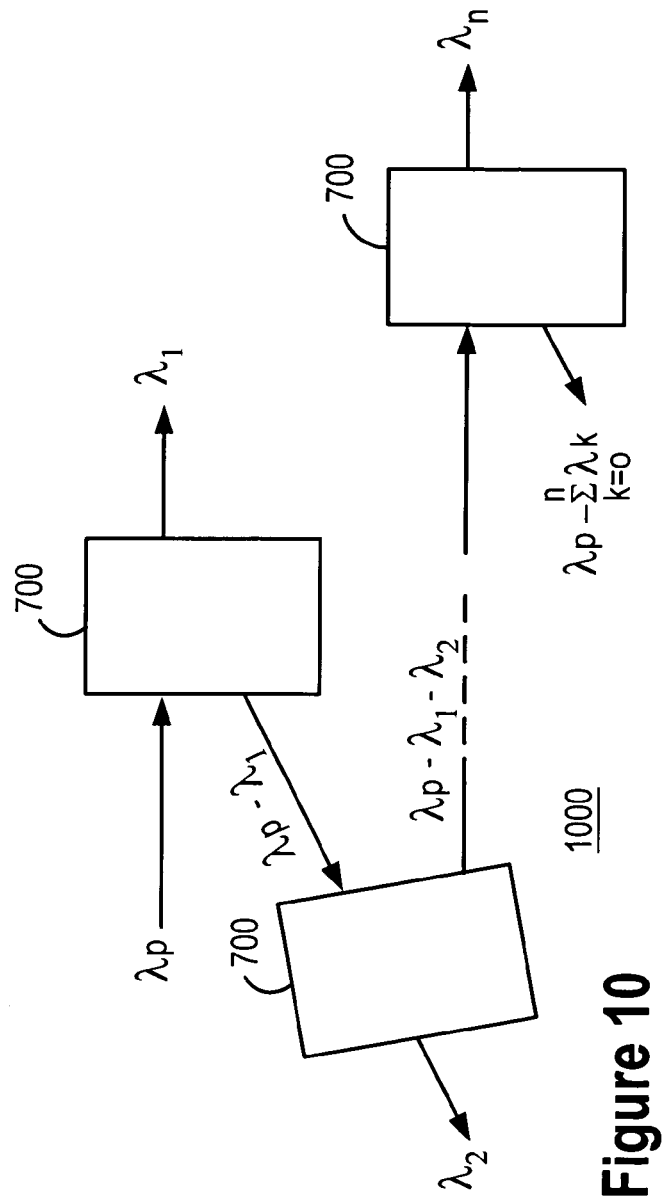
Figure 9
Figure 10

TUNABLE ADD/DROP NODE FOR OPTICAL NETWORK

RELATED APPLICATIONS

This application is related to U.S. patent application Ser. No. 09/724,176, now abandoned, entitled "Optical Filter Module Having A Selectable Bandwidth" filed on Nov. 28, 2000 and is incorporated by reference herein in its entirety.

BACKGROUND

1. Field of the Invention

The invention relates in general to one or more optical networking components and, more particularly, to add/drop nodes.

2. Background of the Invention

Optical networks include one or more optical fibers that each carry several channels of information. Each channel of information is carried in a light signal having a different wavelength. A variety of optical networks also include one or more add/drop nodes where one or more channels of information is added to an optical fiber or dropped from an optical fiber.

Many add/drop nodes allow a first signal of a channel of information to be dropped from an optical fiber and allow another signal of the same channel to be added to the same optical fiber. Different information can be carried within the channel using the different signals. For instance, the first signal of the channel can be destined for a first city and the second signal can originate at the first city and be destined for a second city. When the add drop node is located in the first city, the first signal on the channel can be dropped from the optical fiber for processing in the first city. The second signal on the channel can be added to the fiber optic and directed to the second city by the network.

Add/drop nodes can be tunable. A tunable add/drop node allows the channel of information that is dropped and/or added at a particular add/drop node to be selected. When the add/drop nodes changes the channel that is added and/or dropped from a first channel to a second channel, the add/drop node must scan through each of the channels between the first channel and the second channel. As a result, a fiber optic carrying a channel dropped at the node would temporarily carry each of the channels between the first channel and the second channel. Hence, information carried in the channels between the first channel and the second channel can be lost as the add/drop node is tuned.

There is a need, therefore, for an add/drop node that can be tuned without loss of information.

SUMMARY OF THE INVENTION

In an exemplary embodiment of the invention, an input port of an add/drop node receives a plurality of optical channels. An add/drop port transmits a first drop channel of the plurality of channels when in a first channel mode and a second drop channel of the plurality of optical channels during a second channel mode. An output port transmits the second drop channel during the first channel mode and the first drop channel during the second channel mode. When the add/drop node is tuned from the first channel to the second channel, the output port transmits at least the plurality of channels spectrally located between the first channel and the second channel.

In one exemplary implementation, a switch directs all channels received at the input port to the output port while a tunable channel selector is tuned to the appropriate channel. The switch directs the channels from the input port to the channel selector after the channel selector is tuned. The appropriate channels are directed to and from the add/drop port by the channel selector. The channel selector can have a variable bandwidth, allowing the bandwidth of add/drop channel to be changed.

BRIEF DESCRIPTION OF THE FIGURES

FIG. 9 is a block diagram of an exemplary channel selector implemented as a multiple drop channel selector in a transmit-through configuration.

FIG. 10 is a block diagram of an exemplary channel selector implemented as a multiple drop channel selector in a reflective configuration.

DETAILED DESCRIPTION OF THE PREFERRED EMBODIMENT

In accordance with an exemplary embodiment of the invention, an optical add/drop node tunes from a first drop channel to a second drop channel without losing information contained within optical channels spectrally located between the two optical channels. Throughout this disclosure, the term "optical channel" refers to any band-limited frequency spectrum within the light spectrum. One or more optical signals can be conveyed through an optical channel.

A plurality of channels received at the input of the optical add/drop node are directed through one or more channel selectors to direct a drop channel to an add/drop port of the add/drop node. An alternate optical channel received at the add/drop port is directed to the output of the add/drop node in place of the drop channel. In response to a channel controller, the drop channel can be changed from a first drop channel to a second drop channel. In one implementation, the plurality of optical channels are directed from the input to the output while a channel selector is tuned to the second drop channel. In another implementation, a second channel selector is tuned to the second drop channel prior to directing the plurality of optical channels to the second channel selector. Although several exemplary embodiments are discussed below, those skilled in the art will recognize other implementations and variations based on the teachings herein.

Figure 1:
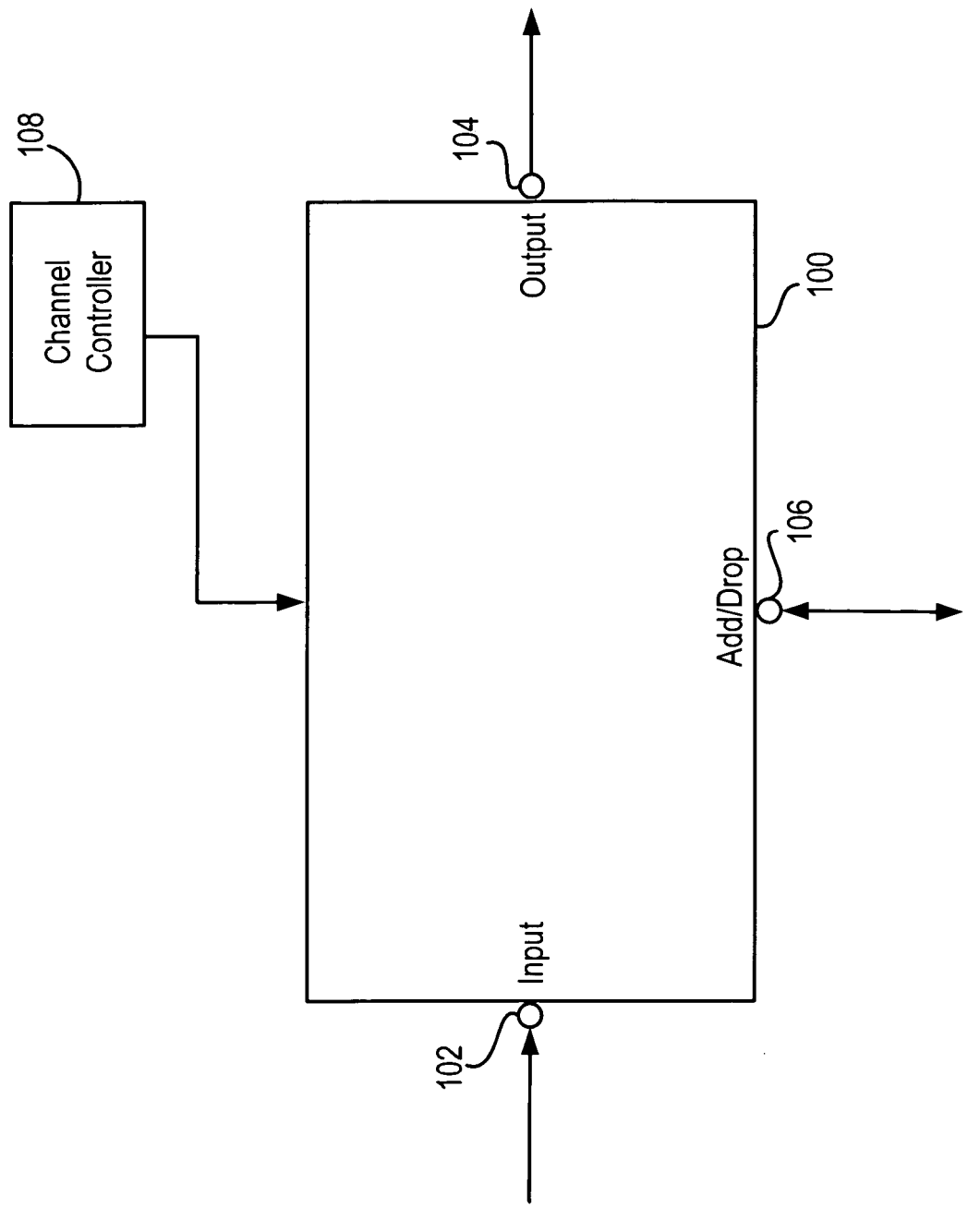
FIG. 1 is a block diagram of a add/drop node in accordance with an exemplary embodiment of the invention.

FIG. 1 is a block diagram of an optical add/drop node 100 in accordance with an exemplary embodiment of the invention. In the exemplary embodiment, the add/drop node 100 is a wavelength add/drop node (WAD). A plurality of optical channels are received at an input port 102 of the optical add/drop node 100. During a first channel mode of operation, one or more drop channels are diverted to an add/drop port 106 allowing only the remaining plurality of channels to be transmitted at the output port 104. For example, if the plurality of channels are represented by $\lambda_1$ through $\lambda_n$, channel $\lambda_2$ may be diverted to the add/drop port 106 resulting in channels $\{(\lambda_1+\lambda_2+\ldots\lambda_n)-\lambda_2\}$ to be produced at the output port 104.

In the exemplary embodiment, the add/drop port 106 is configured to receive at least one alternate optical channel which can be directed to the output port 104. Continuing with the example, if an alternate optical channel is represented by $\lambda_a$, the output at the output port 104 is $(\lambda_1+\lambda_a+\ldots\lambda_n)$. Although the add/drop port 106 provides both an input to receive alternate optical channels and an output to transmit optical channels in the exemplary embodiment, the add/drop port may perform the functions of solely an input or an output. Further, the add/drop port 106 may be implemented using any number of inputs and outputs.

A channel controller 108 in communication with the add/drop node 100 directs the add/drop node 100 to select a particular add/drop channel or channels. In the exemplary embodiment, the channel controller 108 is a printed circuit board that provides all of the control interface and control signals. The channel controller 108 receives signals from a network management layer of the optical network system, and sends data to the add/drop node 100 to control the switch setting, timing setting, channel number setting, adding or dropping setting, and other settings, positions or parameters readily recognized by those skilled in the art. If the add/drop node 100 has a tunable bandwidth allowing selection of a bandwidth, the channel controller 108 also provides control signals to adjust the bandwidth setting.

The add/drop node 100 is in the first channel mode when the first drop channel is directed to the add/drop port 106 and is in the second channel mode when the second channel is directed to the add/drop port 106. During the period between the first channel mode and the second channel mode, the optical channels between the first drop channel and the second drop channel are directed to the output port 104. In some of the exemplary implementations discussed below, all of the plurality of optical channels received at the input are directed to the output port 104 while a channel selector is tuned from a first frequency bandwidth of the first drop channel to a second frequency bandwidth of the second drop channel during a channel tuning mode. As is discussed below in further detail, a filter element within the channel selector is shifted to a different position relative to an incident optical signal beam, that includes the plurality of optical channels, to tune the channel selector. The add/drop port 106 may be configured to add or drop any number of optical channels.

Accordingly, no information conveyed by the plurality of optical channels is lost during the channel tuning mode. If the add/drop node 100 is implemented as part of an optical networking system where channels are dropped and added to the plurality of optical channels in order to route information to the intended destination, information not intended to be directed away from the output port 104 is maintained at the output port 104 during the channel tuning mode.

Figure 2:
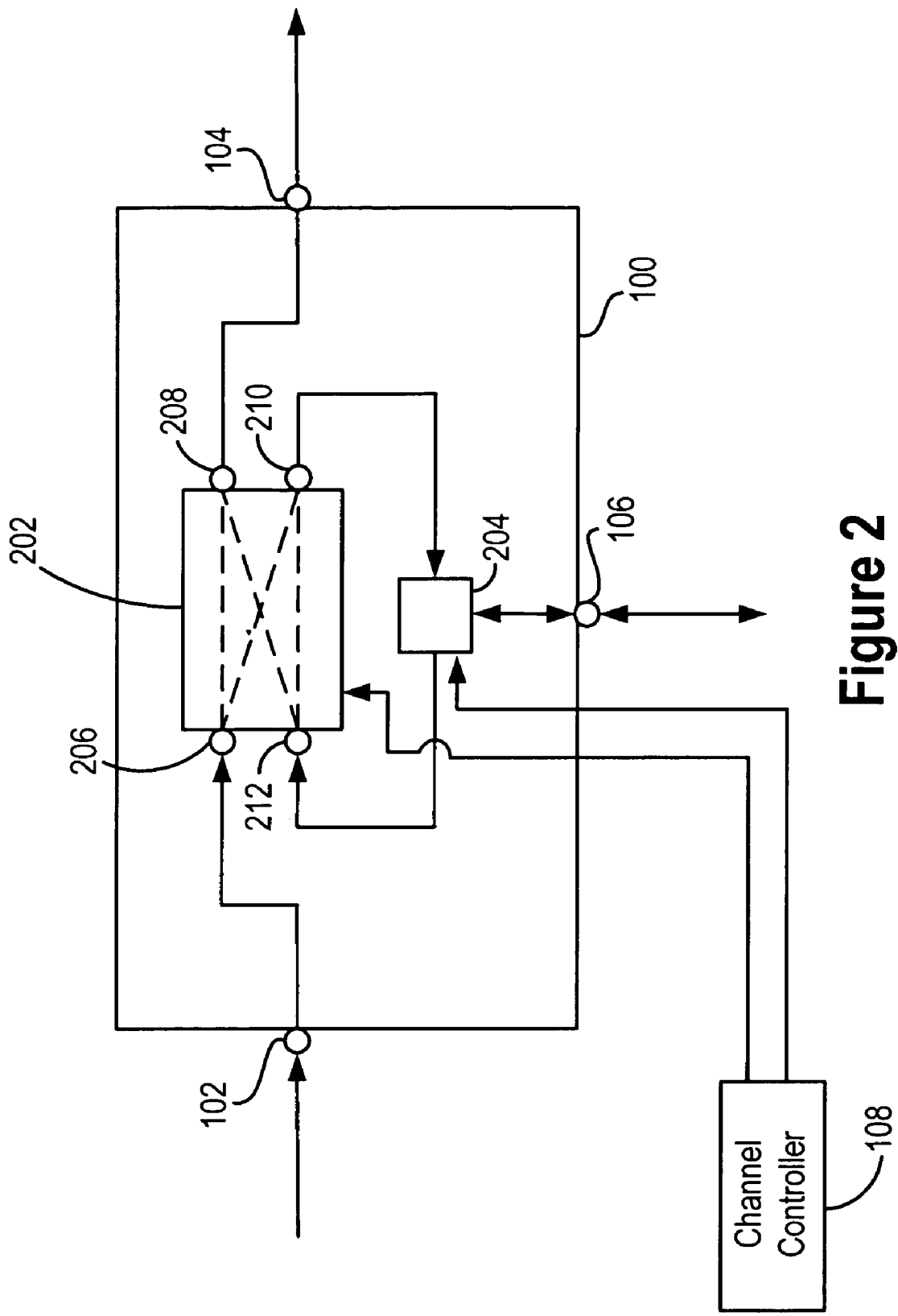
FIG. 2 is a block diagram of a first exemplary implementation of the add/drop node in accordance with the exemplary embodiment of the invention.

FIG. 2 is a block diagram of a first exemplary implementation of the add/drop node 100 in accordance with the exemplary embodiment of the invention. A switch 202 is optically coupled to a channel selector 204 to the input and output ports 102, 104. Throughout this disclosure, "optically coupled" refers to an optical connection where the two or more elements, ports or devices are in optical communication. The optical connection may be a direct physical connection or may be a connection through one or more additional devices or elements. Optical signals and channels within an optical frequency spectrum or portion of optical frequency spectrum may be transmitted between elements, devices or ports that are optically coupled.

In the first exemplary implementation of the add/drop node 100, the switch 202 includes four ports 206–212. The switch 202 may be any one of several optical switches capable of performing the functions as described herein. Examples of suitable switches are the 2 by 2 single mode fiber optic switches manufactured by the JDS Uniphase, E-Tek Dynamics and DiCon Fiberoptics Inc. companies. A first input port 206 of the switch 202 is optically coupled to the input port 102 of the add/drop node 100. The first input port 206 and the add/drop input port 102 may be the same element. A first output port 208 of the switch 202 is optically coupled to the output port 104 of the add/drop node 100. The first output port 208 may be the same element as the output port 104 of the add/drop node 100. A second output port 210 of the switch 202 is optically coupled to an input of the channel selector 204 and an output of the channel selector 204 is optically coupled to the second input port 212.

In a first position of the switch 202, optical signals and channels are directed from the first input port 206 to the first output port 208. In a second position, the optical signals and channels are directed from the first input port 206 to the second output port 210 and optical signals and channels received at the second input port 212 are directed to the first output port 208.

The channel selector 204 may have any one of various configurations as will be discussed in further detail below. For example, the channel selector 204 may be tunable and have fixed bandwidth or may be tunable and have a variable bandwidth that can be selected by the channel controller 108. The channel selector 204 diverts a portion of the incoming optical spectrum received at its input to its output coupled to the add/drop port 106 and allows the remainder of the optical spectrum received at the input to continue to the second switch input port 212. The add/drop port 106 may be one of the outputs of the channel selector 204. Further, the add/drop port 106 may physically consist of two or more separate ports. An add port may be configured to receive alternate optical channels and a drop port may be configured to transmit the portion of the spectrum diverted from the received optical spectrum. In systems that utilize a single optic fiber, a device such as a circulator may be utilized to allow the add/drop port 106 to be bi-directional. In implementations where separate fibers are used for the add and drop ports, each of the ports facilitates transmission in only one direction.

Assuming, for example, channels $\lambda_1$ through $\lambda_n$ are received at the first switch input port 206 and directed to the channel selector 204 through the second switch output port 210, a channel, such as channel $\lambda_3$, is directed to the add/drop port 106. The remainder of the optical channels $\{(\lambda_1+\lambda_2+\ldots\lambda_n)-\lambda_3\}$ are directed to the second switch input port 212. The switch 202 directs this remainder of channels to the first switch output port 208 and, therefore, to the output port 104 of the add/drop node 100. In addition, an alternate channel ($\lambda_a$) received at the add/drop port 106 can be combined with the remainder of the optical channels to form a plurality of channels including channels $\{(\lambda_1+\lambda_2\ldots\lambda_n)-\lambda_3+\lambda_a\}$. The alternate channel ($\lambda_a$) has the same wavelength as the dropped channel ($\lambda_d$) and may or may not have the same bandwidth as the dropped channel ($\lambda_d$) In this example, therefore, channels $\lambda_3$ and $\lambda_a$ have the same frequency.

In the first exemplary implementation of the exemplary embodiment, the channel selector 204 is tunable and responsive to commands received from the channel controller 108. When the channel controller 108 instructs the add/drop node 100 to change from a first channel to a second channel, the switch 202 is set to direct signals received at the first input port 206 to the first output port 208 allowing all of the plurality of channels received at the input port 102 to be directed to the output port 104. The channel selector 204 is tuned from the first channel to the second channel. Although the channel may scan through each of the optical channels between the first channel and the second channel as it changes channels, all of the channels received at the input port 102 are present at the output port 104 minimizing the loss of information. After the channel selector 204 is set to the second channel, the switch 202 is configured to direct optical channels received at the second switch input port 206 to the first switch output port 208.

In the exemplary embodiment, the channel controller 108 provides the appropriate control signals to the switch 202 and channel selector 204 to perform the functions described above. The data protocol of the optical network system defines the transmission traffic direction, switch states (positions), and frequencies of the channels to be added and/or dropped. Using known techniques, the channel controller 108 converts the incoming digital data into the appropriate voltage or current drive level to set the switch 202 to the appropriate position, and to tune the channel selector 204 to the first channel mode or the second channel mode.

Figure 3:
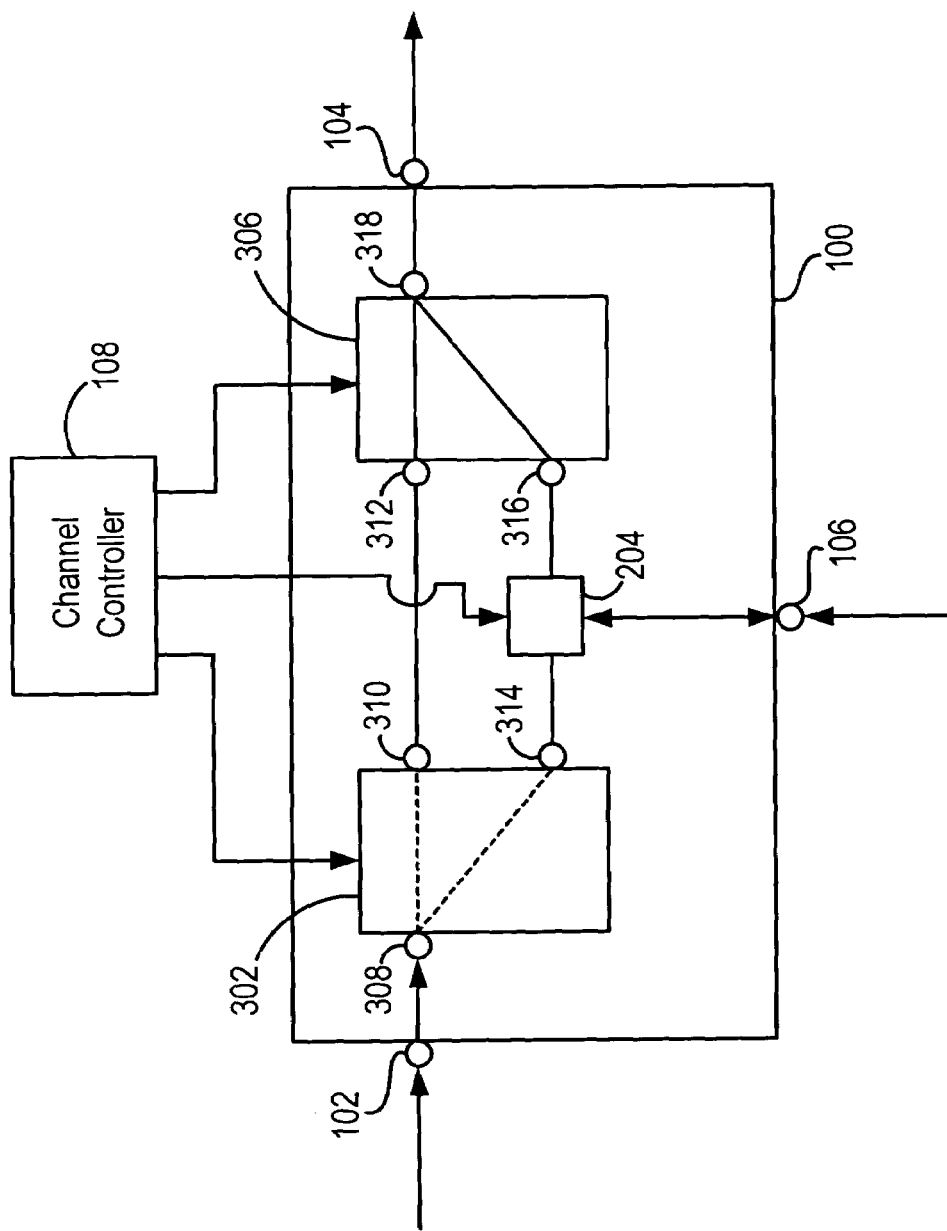
FIG. 3 is a block diagram of a second exemplary implementation of the add/drop node in accordance with the exemplary embodiment of the invention.

FIG. 3 is a block diagram of a second exemplary implementation of the add/drop node 100 in accordance with the exemplary embodiment of the invention. In the second exemplary implementation, the add/drop node 100 includes at least a switch 302, an optical channel combiner 306, and a channel selector 204. An input 308 of the switch 302 is optically coupled to the input port 102 and may be the same element as the input port 102. The first output 310 of the switch 302 is optically coupled to a first combiner input 312 of the optical channel combiner 306. A second output 314 of the switch 302 is optically coupled to an input of the channel selector 204. The output of the channel selector 204 is optically coupled to a second combiner input 316 of the optical channel combiner 306.

The switch 302 may be any one of several optical switches capable of performing the switch functions described below. As those skilled in the art will recognize, the switch 302 should have sufficiently high isolation in order to avoid cross talk and possible interference. An examples of suitable switches include 1 by 2 single mode optical switches manufactured by the JDS Uniphase, E-Tek Dynamics, Oplink Communications, Inc., PIRI (Photonic Integration Research, Inc.) and DiCon Fiberoptics Inc. companies. In a first position of the switch 302, the plurality of optical channels received at the input 308 are directed to the first output 310. In a second position, the plurality of optical channels are directed to the second output 314.

The optical channel combiner 306 combines optical channels received at the first input 308 and the second input 316 to produce a combined optical spectrum of resulting optical channels at the output 318 of the optical channel combiner 306. The optical channel combiner 306 may be any one of several optical channel combiners capable of performing the combining functions described below. Examples of suitable optical channel combiners include 2 by 1 optical signal combiners manufactured by the JDS Uniphase, E-Tek Dynamics, Oplink Communications, and DiCon Fiberoptics Inc. companies.

When the switch 302 is in the first position, all of the plurality of optical channels received at the input 102 are directed to the first input 312 of the optical channel combiner 306 and none of the optical channels are directed to the channel selector 204. Accordingly, if no alternate optical channel is added by the channel selector 204, no channels will be present at the second combiner input 316 and only the plurality of optical channels received at the input 102 will be produced at the combiner output 318. If an alternate optical channel is received at the add/drop port 106, the alternate optical channel will be combined with the plurality of optical channels and will interfere with the optical channel having the same frequency as the alternate optical channel. This interference can be avoided by regulating the add/drop port 106 to the channel selector 204. Further, the interference will not be an issue since most networking protocols require a channel to be dropped before a channel is added. Also, if the add/drop node 100 is utilized only as a drop node, where no alternate channels are received at the add/drop port 106, interference is not an issue.

When the switch 302 is in the second position, the plurality of optical channels are directed to the second output 314 of the switch 302 and the input of the channel selector 204. During the first channel mode, the channel selector 204 diverts the first optical channel to the add/drop port 106 and directs any alternate optical channel to the second input 316 of the optical channel combiner 306. The optical channel combiner 306 combines the optical channels received at both-combiner inputs 312, 316 to produce an output optical frequency spectrum. The output optical frequency spectrum includes the plurality of optical channels received at the input port 102 without the first optical channel and the alternate optical channel.

In response to the channel controller 108, the channels are changed from the first channel to the second channel. Before the channel selector 204 begins changing channels during the channel tuning mode, the switch 302 is set to direct all of the plurality of optical channels from the input 308 to the output 310. As explained above, all of the plurality of channels appear at the output 104 of the add/drop node 100 during the channel tuning mode when the switch 302 is in this first position.

During the channel tuning mode, the switch 302 remains in the first position and the channel selector 204 changes from the first channel to the second channel in response to the channel controller 108. After the second channel is selected, the switch 302 is set to the second channel mode allowing the plurality of optical channels received at the input 102 to pass through the channel selector 204. During the second channel mode, the second optical channel of the plurality of optical channels is dropped by directing the second optical channel to the add/drop port 106. The output frequency spectrum produced at the output 104, therefore, includes plurality of optical signals received at the input port 102 where the second optical channel is replaced with the alternate channel at the same frequency.

Figure 4:
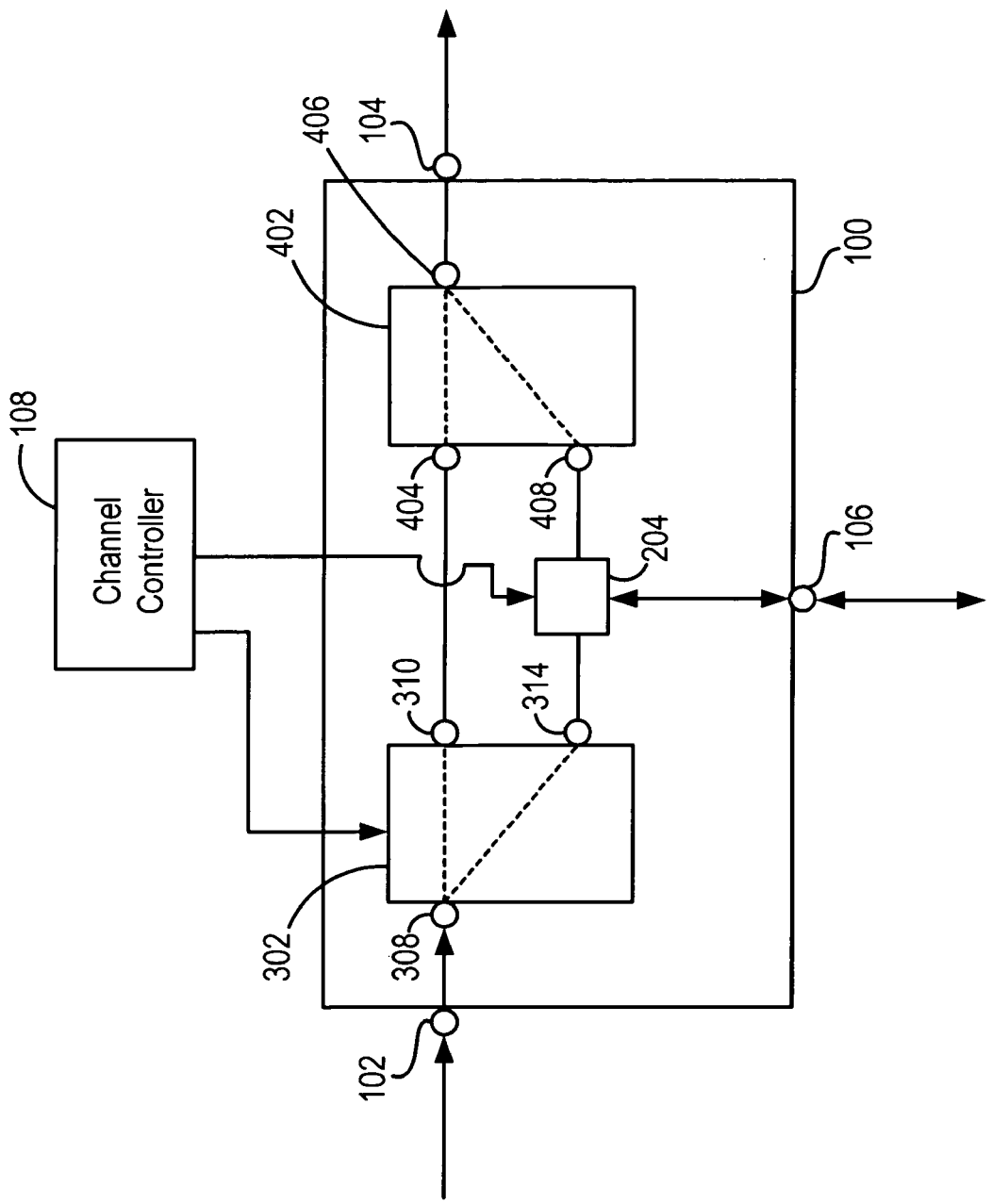
FIG. 4 is a block diagram of a third exemplary implementation of the add/drop node in accordance with the exemplary embodiment of the invention.

FIG. 4 is a block diagram of a third exemplary implementation of the add/drop node 100 in accordance with the exemplary embodiment of the invention. The third exemplary implementation is the same as the second exemplary implementation described above in reference to FIG. 3 except that the combiner 306 is a switch 402. As those skilled in the art will recognize, the isolation requirements of the switch 302 can be relaxed by using a second switch 402. Examples of a suitable switches for use as the first switch 302 and the second switch 402 include 1 by 2 single mode optical switches manufactured by the JDS Uniphase, E-Tek Dynamics, Oplink Communications, Inc., PIRI (Photonic Integration Research, Inc.) and DiCon Fiberoptics Inc. companies.

The operation of the add/drop node 100 in the third exemplary implementation is similar to the second exemplary implementation except that the position of the second switch 402 is changed simultaneously with the position of the first switch 302. When the first switch 302 is in the first position and allows the plurality of optical channels at the input port 102 to pass directly to the first input 404 of the second switch 402, the second switch 402 is also in a first position that allows the optical channels at only the first input 404 to pass to the output 406. When the first switch 302 is in the second position the plurality of optical channels are directed through the channel selector 204 and the resulting optical channels at the output of the channel selector 204 are received at the second input 408 of the second switch 402 which also in a second position. Only the optical channels received at the second input 408 of the second switch 402 are directed to the output 104 when the second switch 402 is in the second position.

Therefore, during the channel tuning mode, the switches remain in the first position allowing all of the channels received at the input 102 to pass to the output 104. After the channel selector 204 is tuned to the appropriate channel, the switches 302, 402 are set to the second position.

Figure 5:
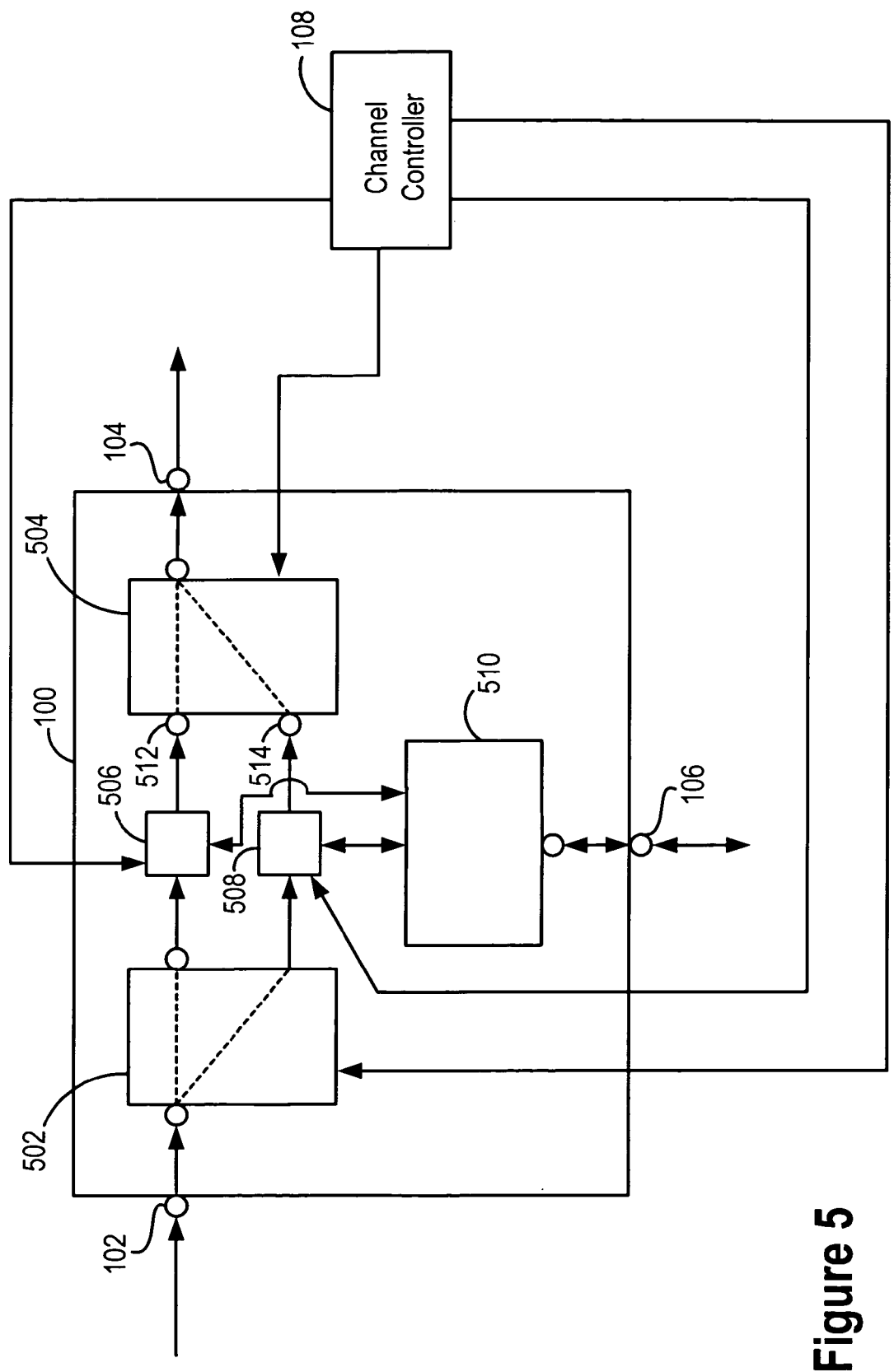
FIG. 5 is a block diagram of a fourth exemplary implementation of the add/drop node in accordance with the exemplary embodiment of the invention.

FIG. 5 is a block diagram of a fourth exemplary implementation of the add/drop node 100 in accordance with the exemplary embodiment of the invention. In the fourth exemplary implementation, the add/drop node 100 includes two 1 by 2 optical switches 502, 504, two channel selectors 506, 508 and an optical combiner 510. During the first channel mode, the first switch 502 is in a first position and the plurality of optical channels received at the input 102 are directed to the first channel selector 506. The first channel selector 506 directs the first drop channel to the optical combiner 510 and the remainder of the plurality of optical channels to the second switch 504. The second switch 504 is also in a first position during the first channel mode and directs signals at the first input port 512 to the output port 104.

During the second channel mode, the second switch 502 is in a second position and the plurality of optical channels are directed to the second channel selector 508. The second channel selector 508 directs the second drop channel to the optical channel combiner 510. The second switch 504 is in the second position during the second channel mode and directs the optical channel at the second input port 514 to the output 104.

Although one or both of the channel selectors 508 may be fixed, both channel selectors are tunable in the fourth exemplary implementation. When the drop channel is changed from the first drop channel to the second drop channel, the second channel selector 508 is tuned to the second drop channel. During this channel tuning process, both of the switches 502, 504 remain in the first position. The switches 502, 504 are simultaneously changed from the first position to the second position after the second channel selector 508 is tuned to the second drop channel.

The channel combiner 510 combines the outputs from both of the channel selectors 506, 508. An optical signal will only be present at the output of one of the two channel selectors 506, 508 at any one time and, therefore, only one of the drop channels will be directed to the add/drop port 106. Examples of suitable optical channel combiners include 2 by 2, 3 dB optical channel combiners manufactured by the JDS Uniphase, E-Tek Dynamics, Oplink Communications, Inc., PIRI (Photonic Integration Research, Inc.) and DiCon Fiberoptics Inc. companies.

An alternate channel received by the add/drop port 106 is directed to both channel selectors 506, 508 through the optical channel combiner 510. Those skilled in the art will recognize that the amplification of the alternate channel may be necessary to maintain a suitable signal to noise ratio at each channel selector 508. Alternatively, a switch can be substituted for the channel combiner 510.

If at least one of the channel selectors 506, 508 is not capable of directing all of the plurality of signals from the input port 102 to the output port 104, it may be desirable to utilize 1 by 3 switches where one of the output ports of the first switch 502 is directly connected to one of the input ports of the second switch 504. Such a modification allows the add/drop node 100 to pass the plurality of optical channels received at the input port 102 to the output port 104 which may be necessary in some optical networking schemes.

Figure 6A:
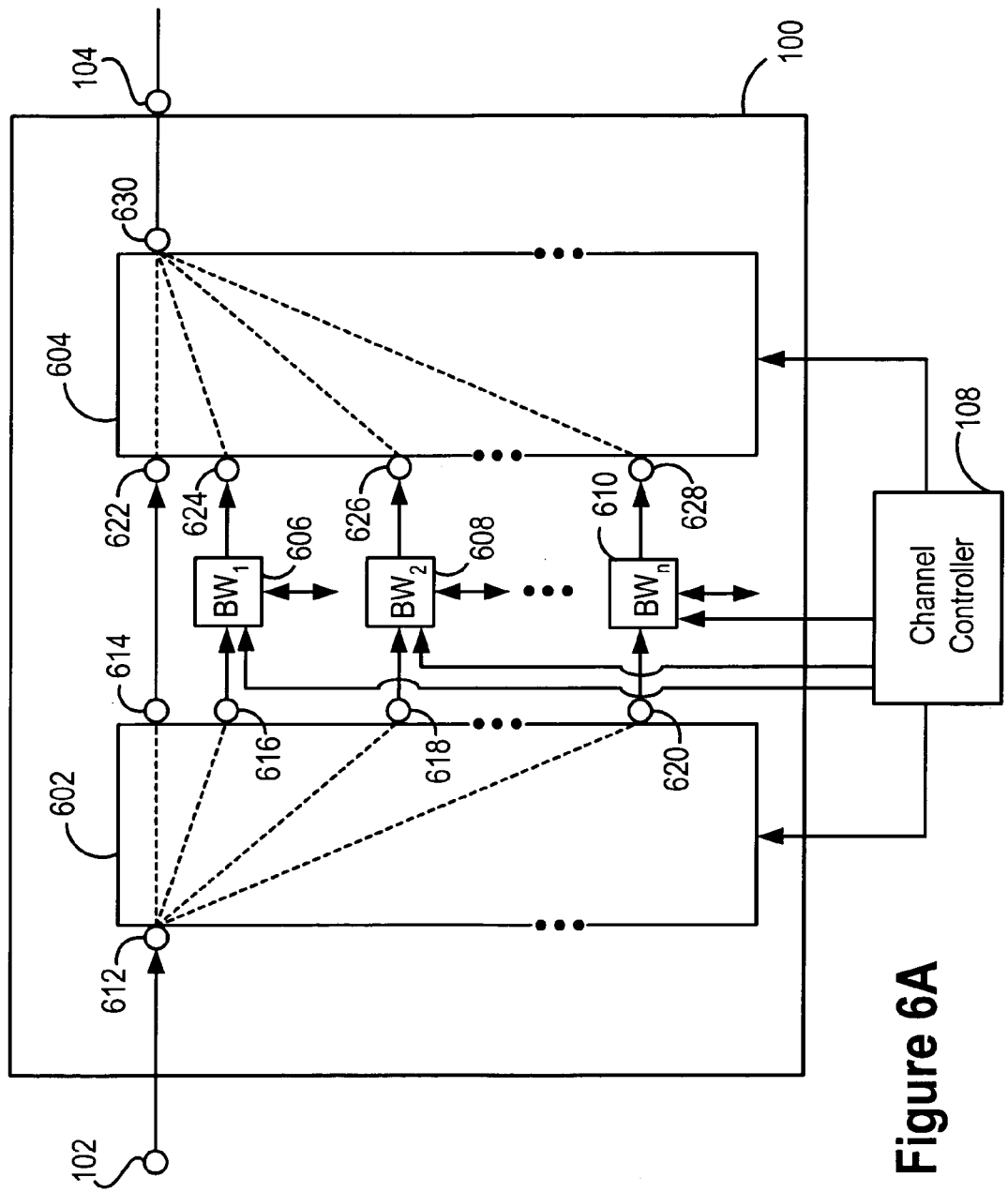
FIG. 6A is a block diagram of a fifth exemplary implementation of the add/drop node in accordance with the exemplary embodiment of the invention.

FIG. 6A is a block diagram of a fifth exemplary implementation of the add/drop node 100 in accordance with the exemplary embodiment of the invention. In the fifth exemplary implementation, the add/drop node 100 includes two switches 602, 604, and a plurality of channel selectors 606–610. The first switch 602 is a 1 by N switch that has a single input port 612 and N output ports 614–620. The second switch 604 has a plurality of input ports 622–628 and an output port 630. Optical channels received at the input port 612 of the first switch 602 can be directed to any one of the output ports 614–620. Any one of the input ports 622–628 of the second switch 604 can be directed to an output port 630 of the second switch 604 and the output port 104 of the add/drop node 100. The positions of the two switches 602, 604 are changed simultaneously to allow selecting a particular channel selector (606–610).

In the fifth exemplary implementation of the add/drop node 100, each channel selector 606–610 is tunable to select a particular add/drop channel and may have either a unique fixed bandwidth or variable selectable bandwidth. Therefore, depending on system requirements, the fifth exemplary implementations of the add/drop node 100 may include any number or combination of fixed bandwidth channel selectors having a fixed frequency, frequency tunable channel selectors having a fixed bandwidth, frequency tunable channel selectors having a selectable bandwidth, and fixed frequency channel selectors having selectable bandwidth.

The channel controller 108 provides the necessary control signals to adjust the bandwidth and frequency of each channel selector 606–610. Therefore, multiple control connections may be required between the channel controller 108 and the add/drop node 100. As explained above, the channel controller 108 can be implemented as a separate printed circuit board that provides all of the control interface and control signals. In addition to receiving the other channel information, the channel controller 108 receives the information bandwidth setting. The data protocol will define the transmission traffic direction, the switch positions, the channels being added/dropped and the bandwidth requirement which depends on the modulated data rate required by the standards such as OC-12, OC-48 and OC 192. If the filter module with the channel selector is a frequency tunable filter module having a selectable bandwidth, the controller provides appropriate signals the adjustment mechanism to set the filter module as discussed below.

When the switch positions are set such that the plurality of channels received at the input 102 are directed through the first channel selector 606, a drop channel having frequency bandwidth of $BW_1$ is dropped while an alternate optical channel having the same bandwidth can be added to the plurality of optical channels as directed to the output port 104. By changing the position of the switches 602, 604 to allow the plurality of optical channels to pass through the second channel selector 608, a second frequency bandwidth can be selected. Since the channel selectors 608 are tunable in the fifth exemplary implementation of the add/drop node 100, the frequency of the drop channel can be the same as the drop channel when the first channel selector 606 is selected or may be different.

In other implementations, the second switch 604 can be replaced with an optical channel combiner. Utilizing an optical channel combiner for the second switch 604, requires that the first switch 602 have adequate isolation between the ports in order to avoid cross talk.

Figure 6B:
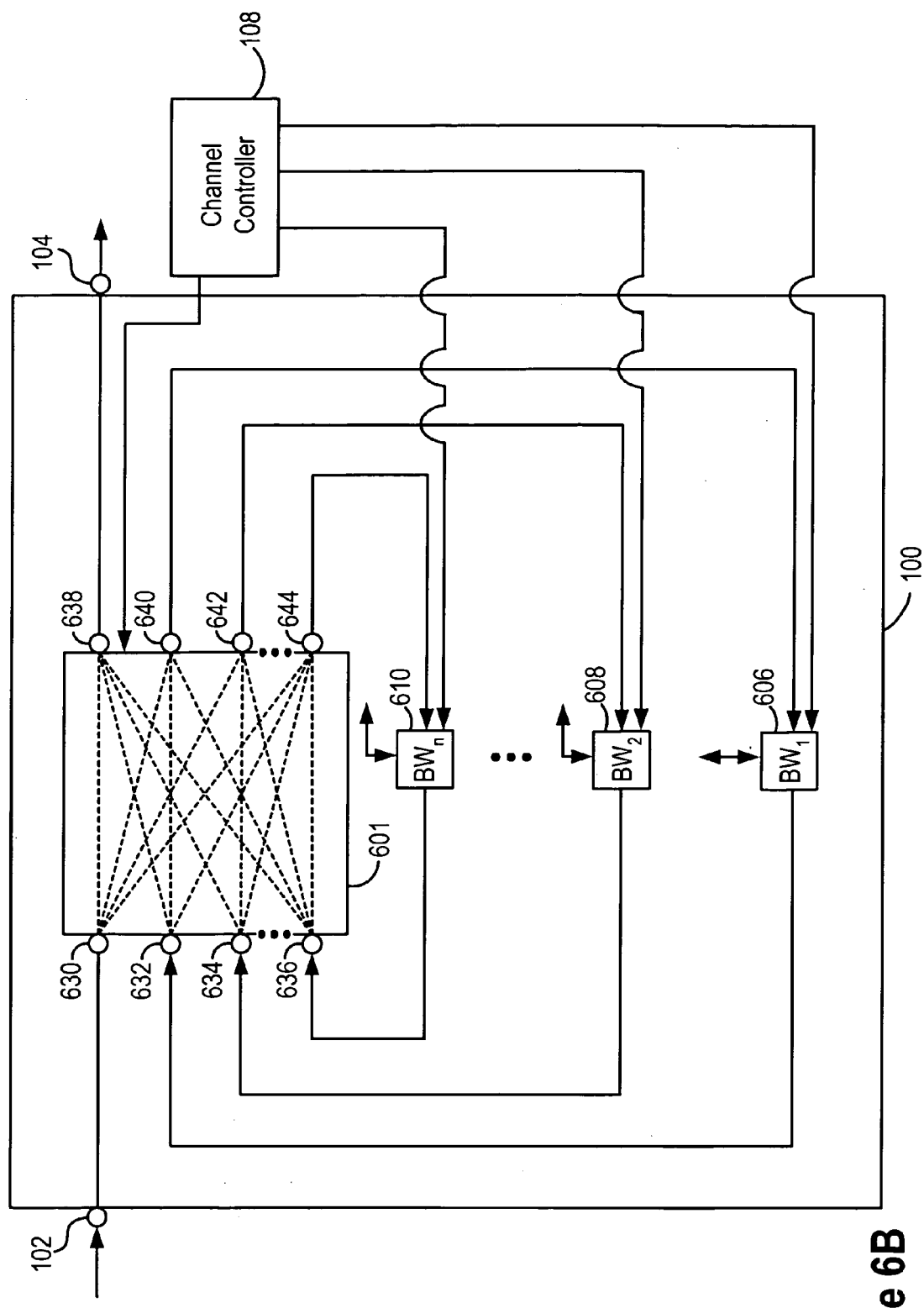
FIG. 6B is a block diagram of a sixth exemplary implementation of the add/drop node in accordance with the exemplary embodiment of the invention.

FIG. 6B is a block diagram of a sixth exemplary implementation of the add/drop node 100 in accordance with the exemplary embodiment of the invention. In the sixth exemplary implementation, a single N by N switch 601 directs the plurality of optical channels received at the input 102 through the plurality of channel selectors 606–610. The signals received at the first input port 630 can be directed to any one of the plurality of output ports 638–644 and signals on any one of the other input ports 632–636 can be directed to the first output port 638. Since each channel selector 606–610 has a unique frequency bandwidth, the bandwidth of the drop channel and the add channel can be selected by appropriately setting the switch 601.

The channel controller 108 provides commands to the switch 601 to facilitate the appropriate setting of the switch 601. The channel controller 108 further provides control signals to one or more of the channel selectors 204 that are tunable either in frequency, bandwidth or both.

The switch 601 may be an integrated N by N switch or may be an arrangement of discrete switches. Examples of suitable switches include N by N switches manufactured by the JDS Uniphase, and DiCon Fiberoptics Inc. companies.

Figure 15:
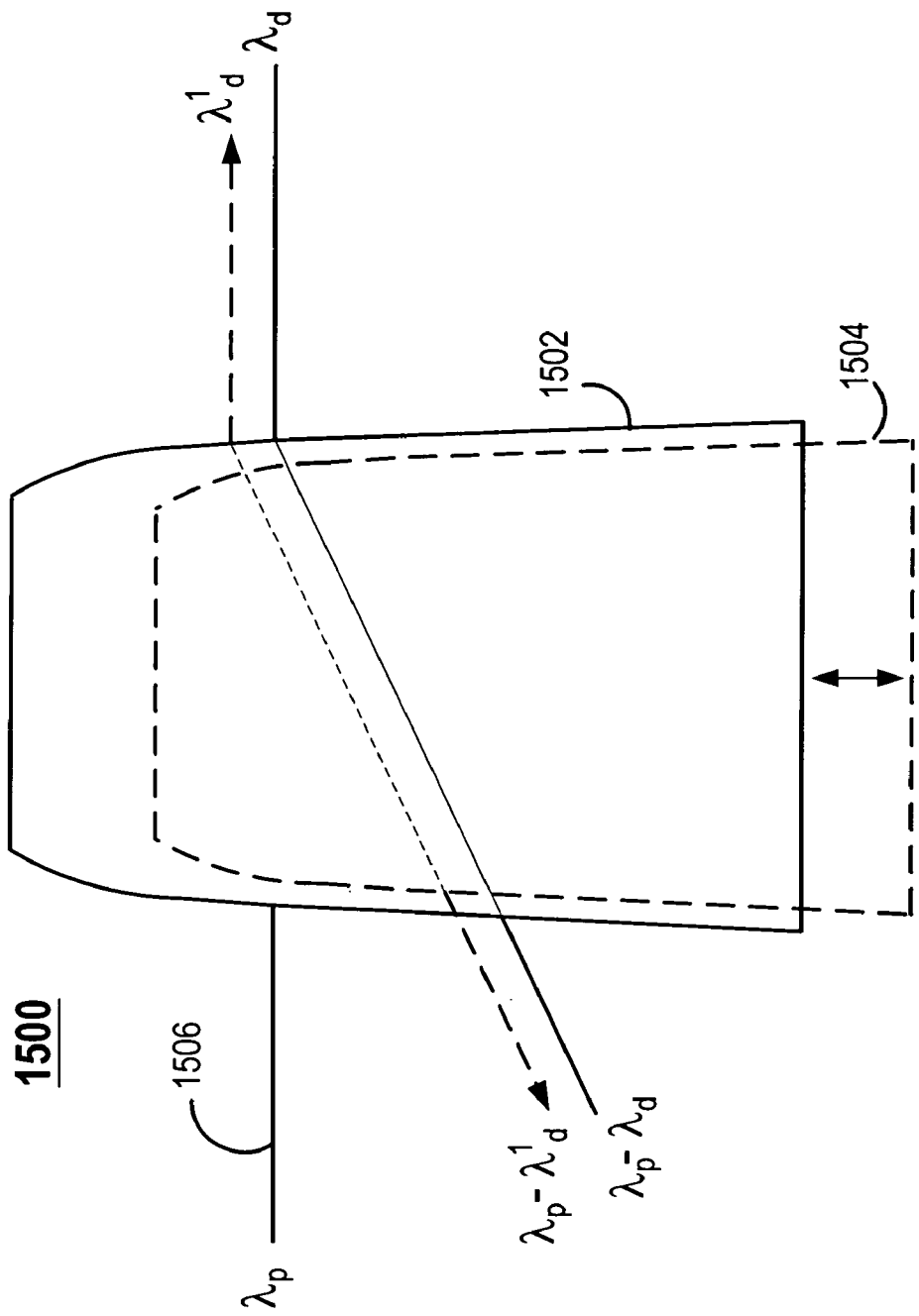
FIG. 15 is block diagram of exemplary tunable filter module.
Figure 16:
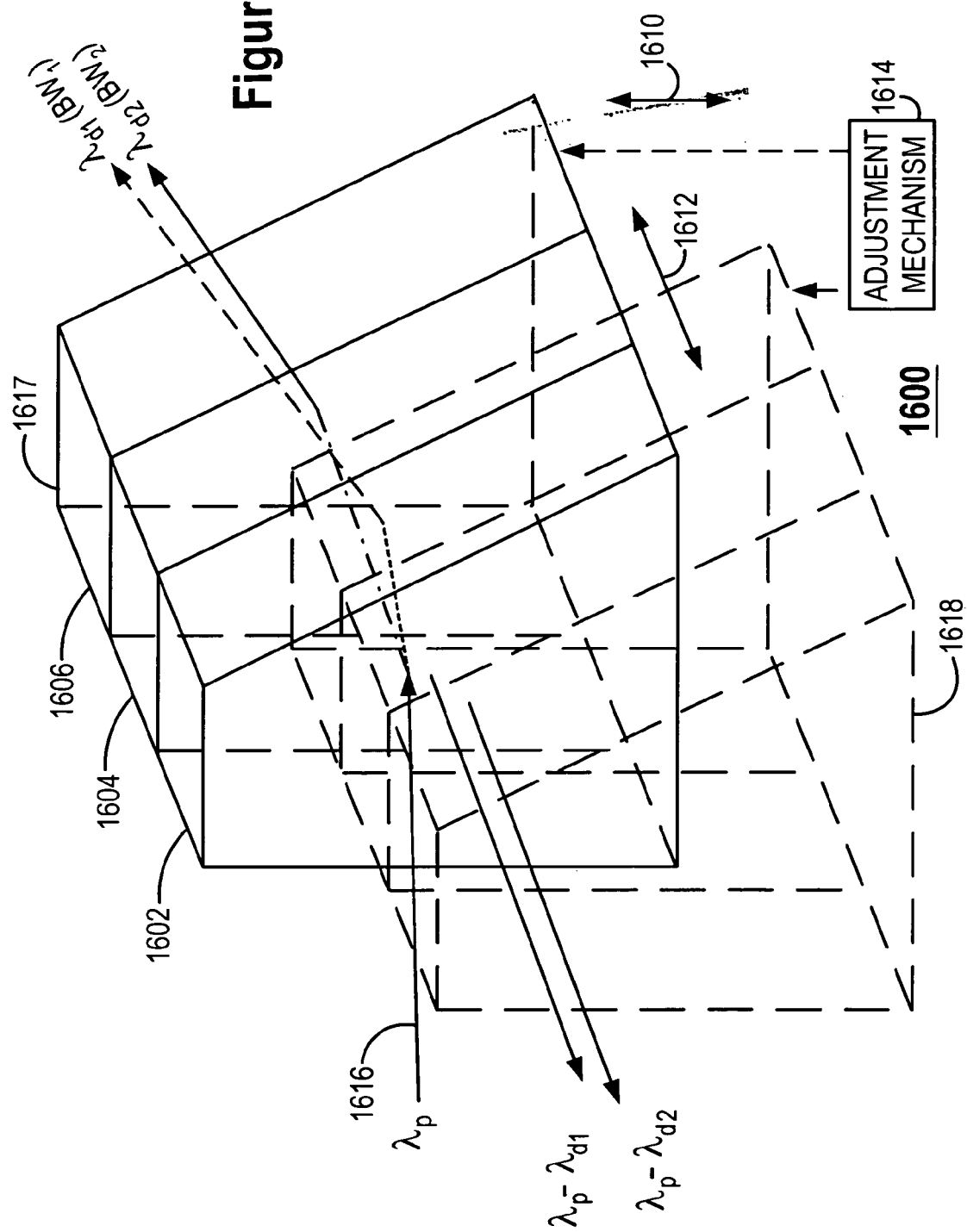
FIG. 16 is a block diagram of a variable bandwidth tunable filter module in accordance with an exemplary embodiment of the invention.

The channel selectors 204, 506, 508, 606–610 may be implemented in a variety of ways and may have any one of several structures or configurations. Examples of some of the various suitable implementations of the channel selector 204 are illustrated in FIGS. 7 through 14. Each of the examples illustrated in FIGS. 7 through 14 is implemented using one or more filter modules. FIGS. 15 and 16 are block diagrams of exemplary implementations of filter modules. Accordingly, each of the filter modules used in the various channel selectors 204, 506, 508, 606–610 may be a fixed bandwidth filter module having a fixed frequency, a frequency tunable filter module having a fixed bandwidth, a frequency tunable filter module having a selectable bandwidth, or a fixed frequency filter module having selectable bandwidth. Those skilled in the art will recognize other channel selectors and filter modules that can be used in accordance with invention. The tunable filter modules and channel selectors are controlled by the channel controller 108.

Figure 7:
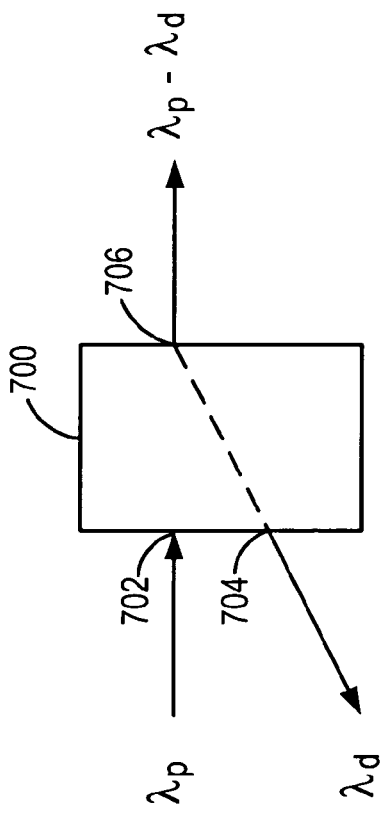
FIG. 7 is block diagram of an exemplary drop filter module.

FIG. 7 is a block diagram of an exemplary drop filter module 700. One or more optical channels ($\lambda_p$) are received at an input port 702. A drop channel ($\lambda_d$) is directed to the drop port 704 while the remainder of the optical channels ($\lambda_p - \lambda_d$) are transmitted to the output port 706.

Figure 8:
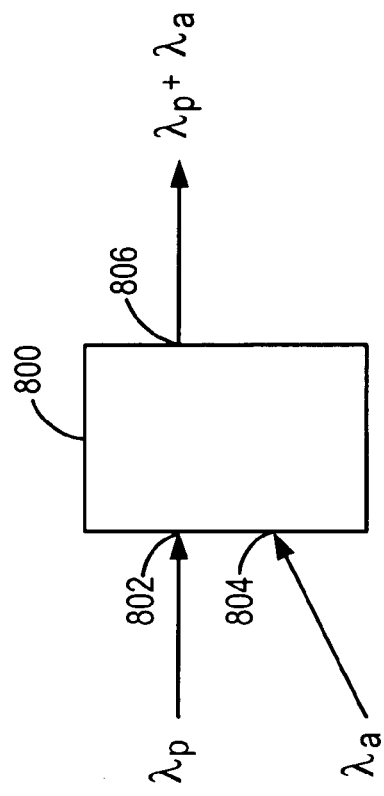
FIG. 8 is block diagram of an exemplary add filter module.

FIG. 8 is a block diagram of an exemplary add filter module 800. One or more optical channels ($\lambda_p$) are received at an input port 802. An add channel ($\lambda_a$) is directed to the add port 804 which is combined with the optical channels ($\lambda_p$) to produce a resulting spectrum ($\lambda_p + \lambda_a$) at the output port 806.

The drop filter module 700 and the add filter module 800 may be formed using a variety of structures and techniques. Examples of suitable methods of implementing the these modules 700, 800 include using techniques that utilize fiber Bragg gratings or other reflection filters, film interference filters, Mach-Zehnder filters, and birefringent filters.

The channel selector 204 may be implemented using a single drop filter module 700 and/or add filter module 800. As discussed below in reference to FIGS. 9 through 14, these filter modules 700, 800 can be combined in a variety of ways to form multiple add/drop channel selectors. Further, the channel selector 204 may include any number of fixed and tunable, add filter modules 800 and drop filter modules 700.

FIG. 9 is a block diagram of an exemplary channel selector 204 implemented as a multiple drop channel selector 900 in a transmit-through configuration. Several drop filter modules are optically coupled in series such that multiple channels ($\lambda_1, \lambda_2, \lambda_n$) are dropped. The multiple drop channel selector 900 is shown as a generic N drop channel selector 900 in order to illustrate that any number of drop filter modules can be connected to form the multiple drop channel selector 900. Each drop filter module 700 drops a particular drop channel and passes the remainder of the optical channels to the next drop filter module 700.

FIG. 10 is a block diagram of an exemplary channel selector 204 implemented as a multiple drop channel selector 900 in a reflective configuration. Several drop filter modules are optically coupled such that multiple channels ($\lambda_1, \lambda_2, \lambda_n$) are dropped. The multiple drop channel selector 1000 is shown as a generic N drop channel selector 900 in order to illustrate that any number of drop filter modules can be connected to form the multiple drop channel selector 900. Each drop filter module 700 drops a particular drop channel and reflects the remainder of the optical channels to the next drop filter module 700.

Figure 11:
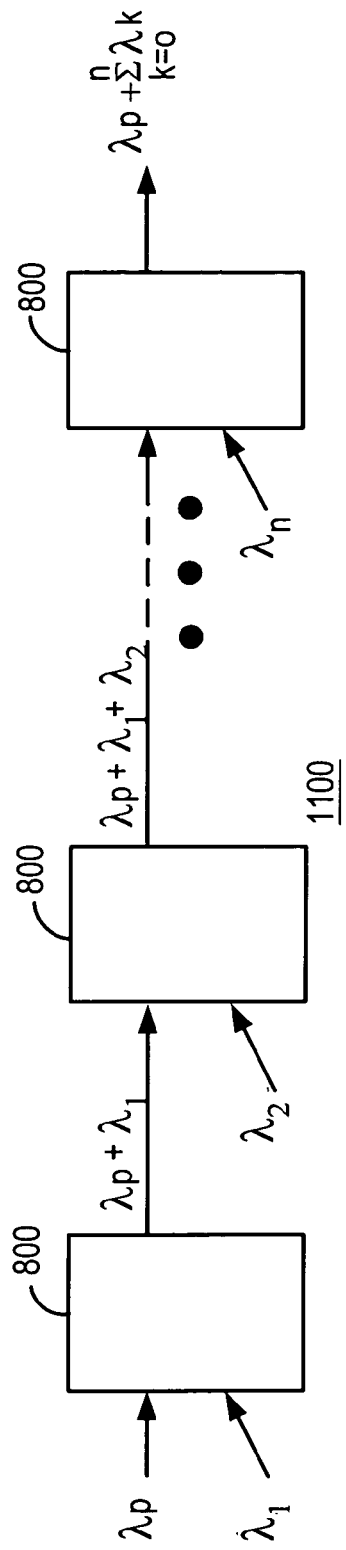
FIG. 11 is a block diagram of an exemplary channel selector implemented as a multiple add channel selector in a transmit-through configuration.

FIG. 11 is a block diagram of an exemplary channel selector 204 implemented as a multiple add channel selector 1100 in a transmit-through configuration. Several add filter modules 800 are optically coupled in series such that multiple channels ($\lambda_1, \lambda_2, \lambda_n$) are added to the plurality of optical channels ($\lambda_p$). The multiple add channel selector 1100 is shown as a generic N add channel selector 1100 in order to illustrate that any number of add filter modules 800 can be connected to form the multiple add channel selector 1100. Each add filter module 800 adds a particular add channel to the optical channels received at its input and passes the resulting combined signal to the next add filter module 800.

Figure 12:
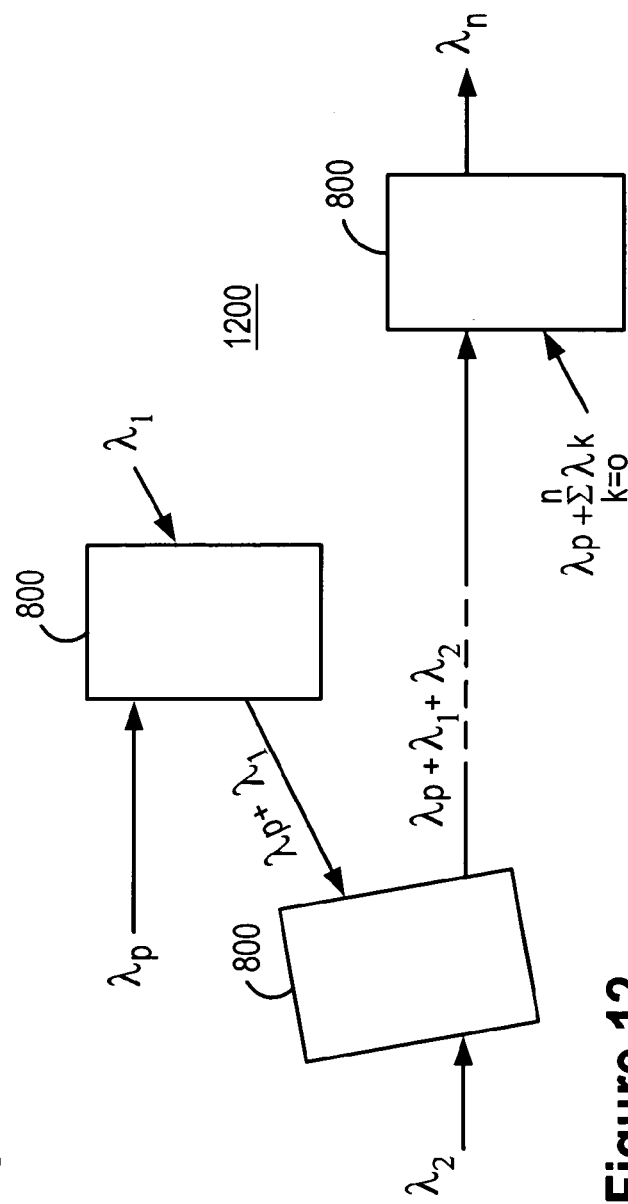
FIG. 12 is a block diagram of an exemplary channel selector implemented as a multiple add channel selector 1200 in a reflective configuration.

FIG. 12 is a block diagram of an exemplary channel selector 204, 506, 508, 606–610 implemented as a multiple add channel selector 1200 in a reflective configuration. Several add filter modules 800 are optically coupled such that multiple channels ($\lambda_1, \lambda_2, \lambda_n$) are added to the plurality of optical channels ($\lambda_p$). The multiple add channel selector 1200 is shown as a generic N add channel selector 1200 in order to illustrate that any number of add filter modules 800 can be connected to form the multiple add channel selector 1200. Each add filter module 800 reflects the optical channels received at its input and passes a particular add channel to its output. The resulting combined signal is directed to the next add filter module 800.

Figure 13:
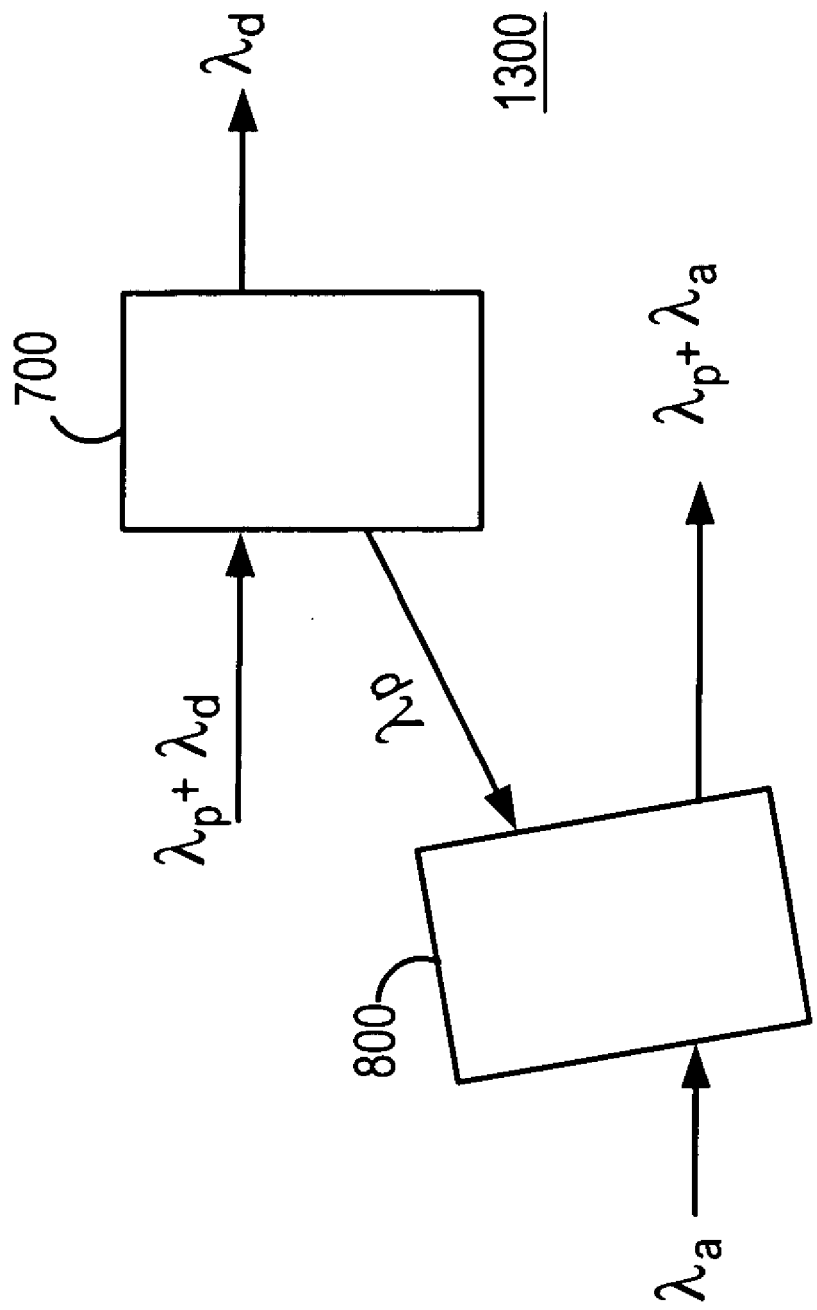
FIG. 13 is block diagram of an exemplary channel selector implemented as a single add/drop channel selector.

FIG. 13 is a block diagram of an exemplary channel selector 204 implemented as a single add/drop channel selector 1300. A single drop filter module 700 is optically coupled to a single add filter module 800 such that a drop channel ($\lambda_d$) is dropped from and an add channel ($\lambda_a$) is added to the plurality of optical channels ($\lambda_p$).

Figure 14:
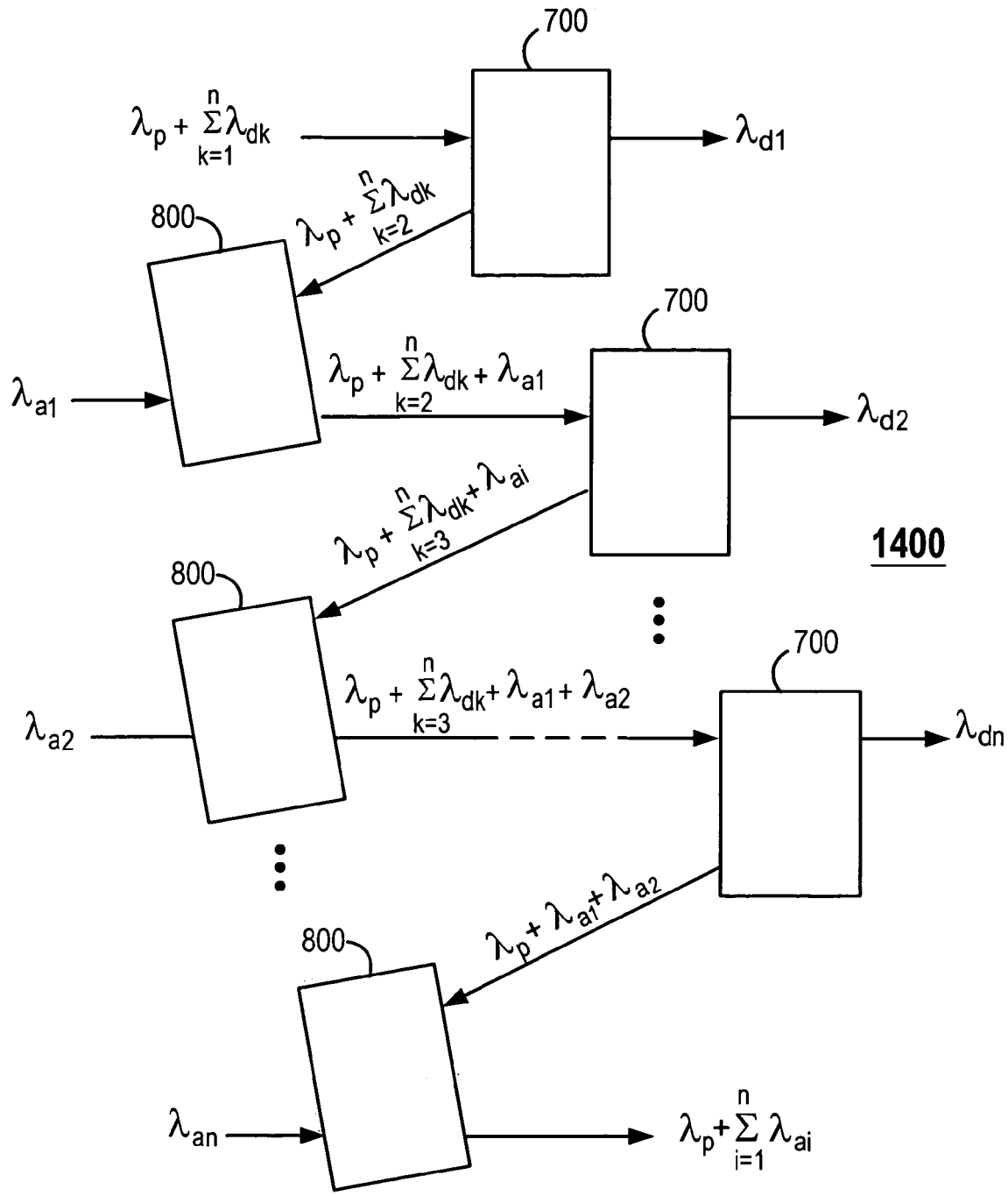
FIG. 14 is a block diagram of an exemplary channel selector implemented as a multiple add/drop channel selector.

FIG. 14 is a block diagram of an exemplary channel selector 204 implemented as a multiple add/drop channel selector 1400. Several drop filter modules 700 are optically coupled to several add filter modules 800 such that multiple add channels ($\lambda_1, \lambda_2, \ldots \lambda_{an}$) are added to the plurality of optical channels ($\lambda_p$) and multiple drop channels ($\lambda_{d1}, \lambda_{d2}, \ldots \lambda_{dn}$) are dropped from the plurality of optical channels ($\lambda_p$). The multiple add/drop channel selector 1400 is shown as a generic N add/drop channel selector 1400 in order to illustrate that any number of drop filter modules 700 and add filter modules 800 can be connected to form the multiple add/drop channel selector 1400. Each drop filter module 700 drops a particular drop channel and reflects the remainder of the optical channels to an add filter module 700. Each add filter module 800 reflects the optical channels received at its input and passes a particular add channel received at its input to its output. The resulting combined signal is directed to the next drop filter module 700.

FIG. 15 is a block diagram of exemplary tunable filter module 1500. Block 1502 illustrates a first position filter element of the tunable filter module 1500 relative to an incident light beam comprising a plurality of optical channels ($\lambda_p$). A drop channel ($\lambda_d$) is dropped from the optical channels ($\lambda_p$) and directed to a drop port while the remainder optical channels ($\lambda_p-\lambda_d$) are reflected to the output of the tunable filter module 1500. When the filter element is moved to second position 1504 (illustrated with a dashed line) relative to the incident light beam 1506, a second drop channel ($\lambda'_d$) is dropped. Therefore, by moving the filter element relative to the light incident beam, the filter module can be tuned to the desired drop channel ($\lambda_d$) Those skilled in the art will readily apply the concepts discussed in regard to the tunable drop filter modules to other types of filter modules. An example of a suitable tunable filter is the tunable filter available from the Santec Corporation which is implemented using a multi-layer dielectric filter with a variable thickness using a sliding mechanism for tuning.

FIG. 16 is a block diagram of a variable bandwidth tunable filter module 1600 in accordance with an exemplary embodiment of the invention. In the exemplary embodiment, the variable bandwidth tunable filter module 1600 includes a plurality of filter elements 1602–1606 where each filter element 1602–1606 has a unique bandwidth. A first filter element 1604 has first bandwidth ($BW_1$) and a second filter element 1606 has a second bandwidth ($BW_2$). The plurality of filter elements 1602–1606 are arranged such that all filter elements 1602–1606 move in conjunction with each of the other filter elements 1602–1606. For example, the plurality of filter elements 1602–1606 can be formed from a single substrate where each filter element is formed to have the desired optical characteristics. Another example includes separately forming each filter element 1602–1606 and bonding the filter elements 1602–1606 together to form the variable bandwidth tunable filter module 1600.

An adjustment mechanism 1614 facilitates moving the plurality of filter elements relative to the optical signal 1616. The adjustment mechanism 1614 is shown as a block connected to the plurality of filter elements with a dashed line to illustrate that the adjustment mechanism 1614 may be implemented in a variety of ways, of which some may not involve a direct connection between plurality of filter elements at the adjustment mechanism 1614. For example, the adjustment mechanism 1614 may be connected to the source of the optical signal (not shown) such a lens or reflector and the plurality of filter elements 1602–1606 may remain in a fixed position. Further, the adjustment mechanism 1614 may be connected to both the plurality of filter elements 1602–1606 and the source of the optical signal. The adjustment mechanism 1614 may be implemented using two separate adjustment mechanisms where each of the two facilitates position adjustment in only of the directions 1610, 1612. In the exemplary embodiment, the adjustment mechanism 1614 moves the plurality of filter elements 1602–1606 relative to the optical signal in response to the channel controller 108 in first axis 1610 and second axis 1612. Changing the relative position of the plurality of filter elements 1602–1606 to the optical signal 1616 in the first axis 1610 allows the filter module 1600 to be tuned in frequency. Changing the relative position of the plurality of filter elements 1602–1606 to the optical signal 1616 in the second axis 1612 allows the bandwidth to be adjusted. The plurality of filter elements 1602–1606 are illustrated using dashed lines to when the plurality of filter elements 1602–1606 are moved to a second position 1618.

When the plurality of filter elements 1602–1606 are in the first position 1617, the optical signal 1616 containing the plurality of optical channels ($\lambda_p$) is received and processed to form the first drop channel ($\lambda_{d1}$) that has a first frequency and first bandwidth ($BW_1$). After the relative positions are changed by the adjustment mechanism 1614 such that the plurality of filter elements 1602–1606 are in the second position 1618, the second dropped channel ($\lambda_{d2}$) having a second bandwidth ($BW_2$) is directed to the add/drop port of the filter module 1600. Therefore, by adjusting the relative position between the plurality of filter elements 1602–1606 and the light beam received at the input port 102, the frequency and bandwidth of the add or drop channel can be selected.

Figure 17:
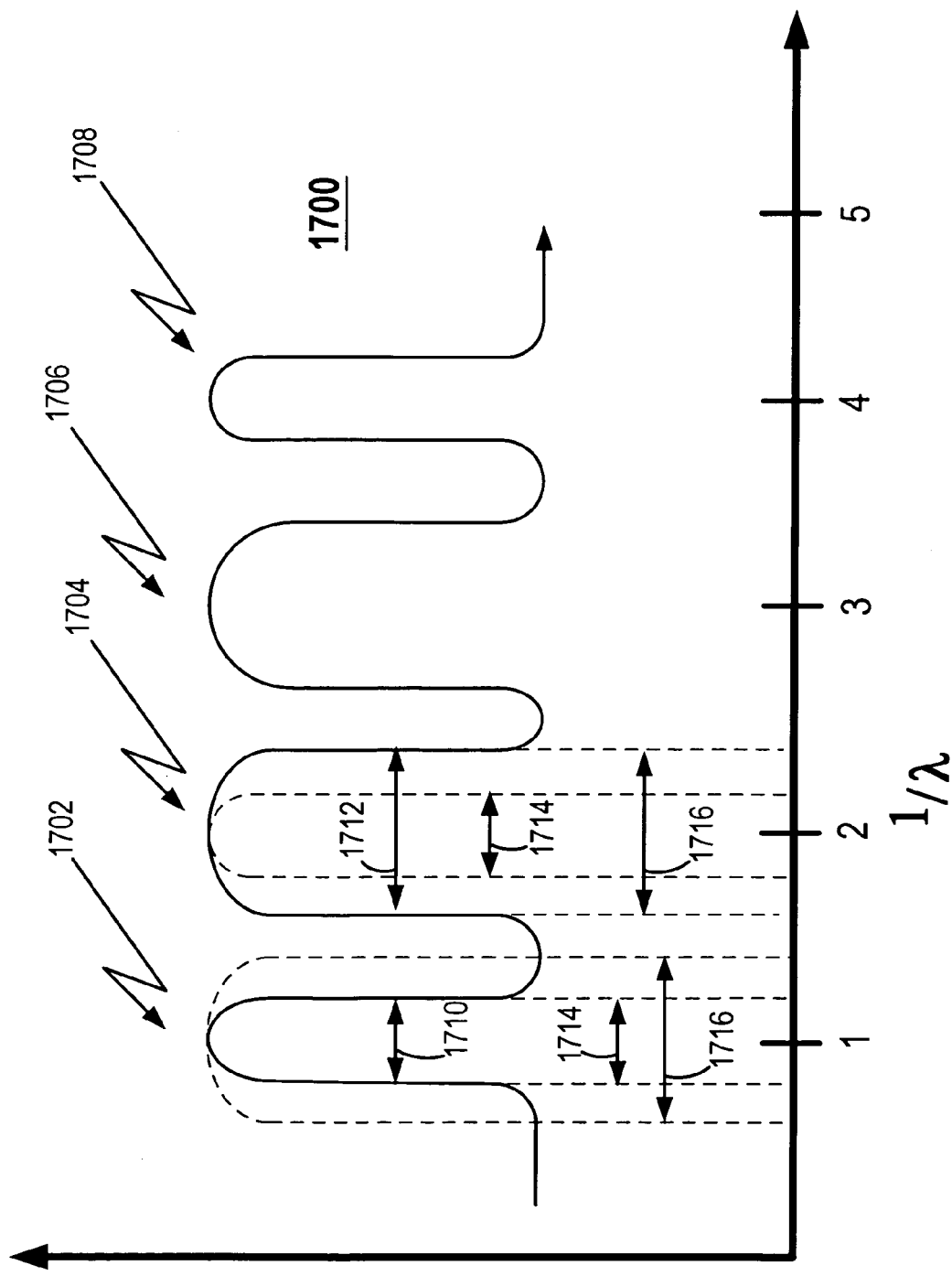
FIG. 17 is a graphical illustration of a optical frequency spectrum in accordance with the exemplary embodiment of the invention.

FIG. 17 is a graphical illustration of an optical frequency spectrum 1700 in accordance with the exemplary embodiment of the invention. A plurality of exemplary optical channels are graphically represented as trace of intensity (I) as a function of an inverse of wavelength 1/λ (or frequency). The first optical channel 1702 has a channel frequency bandwidth 1710 of $BW_1$ while the second optical channel 1704 has a channel frequency bandwidth 1712 of $BW_2$. By passing a first channel 1702 through a channel selector 204 having a filter bandwidth 1714 of $BW_1$, all of the channel is captured without introducing noise and degrading the signal to noise ratio of the first channel 1702. If a filter bandwidth 1716 of channel selector 204 having a wider frequency response is used to filter the first the channel 1702, undesired signals and noise are passed along with the first channel.

By selecting a channel selector 204 having a filter bandwidth 1716 of $BW_2$ to add or drop the second channel 1704 allows all of the second channel 1704 to pass. Using a channel selector 204 filter bandwidth 1714 of $BW_1$ would result in a loss of information.

Figure 18:
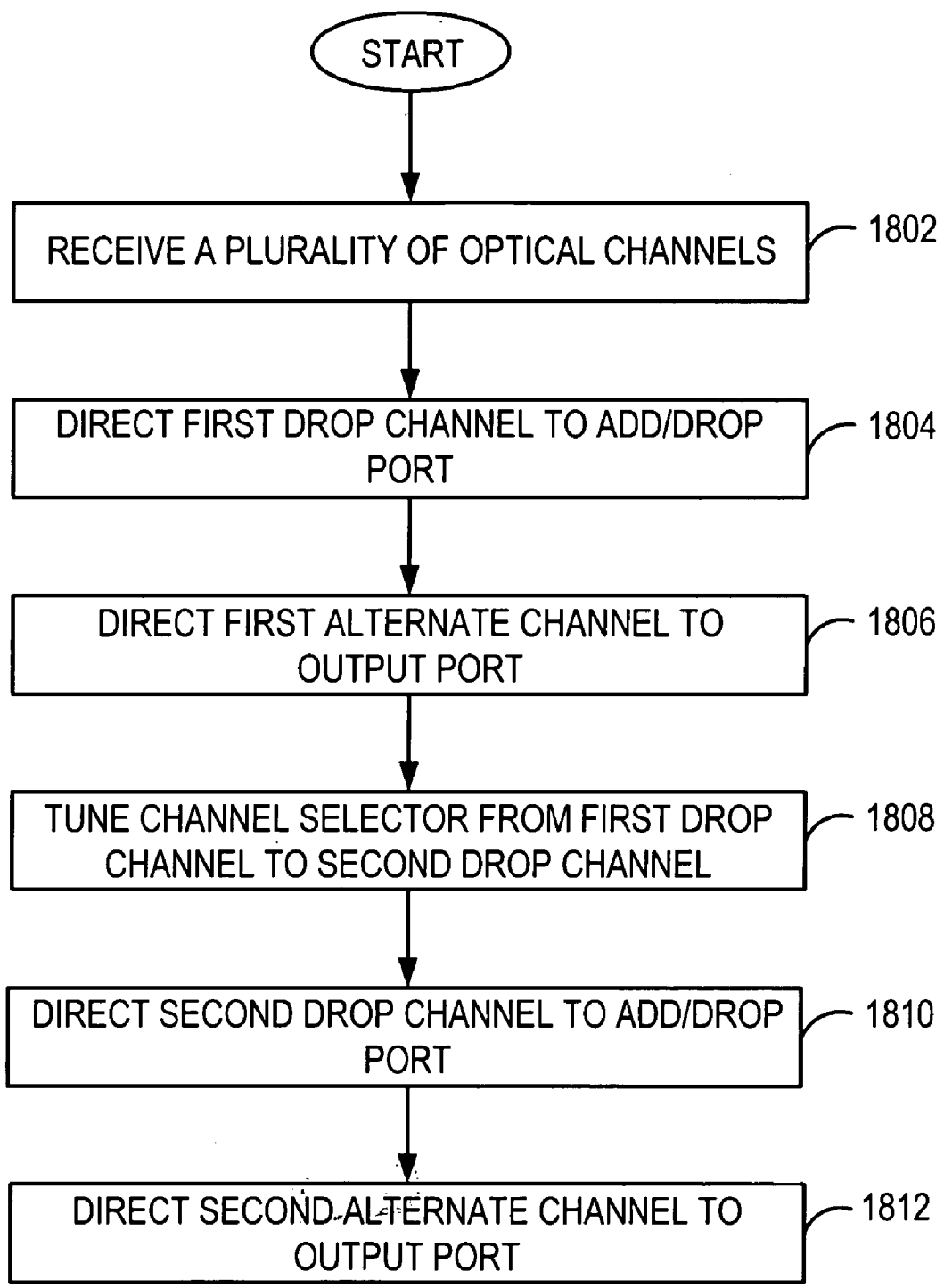
FIG. 18 is flow chart in accordance of an exemplary method of managing channels at an add/drop node.

FIG. 18 is a flow chart in accordance of an exemplary method of managing channels at an add/drop node 100. At step 1802, a plurality of optical channels are received at the input port 102 of the add/drop node 100. The plurality of optical channels include at least a first drop channel and a second drop channel.

Steps 1804 and 1806 are performed during the first channel mode. At step 1804, the first drop channel is directed to the add/drop port 106 of the add/drop node 100 during the first channel mode. At step 1806, the first alternate channel is directed to the output port 104 of the add/drop node 100.

At step 1808, the channel selector 204 is tuned to the second drop channel. During this channel tuning mode, one or more optical channels of the plurality of optical channels spectrally located between the first channel and the second channel are directed to the output port 104 of the add/drop node 100. In one exemplary implementation, all of the channels received at the input port 102 are directed to the output port 104 during the channel tuning mode.

Step 1810 and 1812 are performed during the second channel mode. At step 1810, the second channel is directed to the add/drop port 106 during the second channel mode. The first drop channel is directed to the output port 104 during the second at step 1812.

Figure 19:
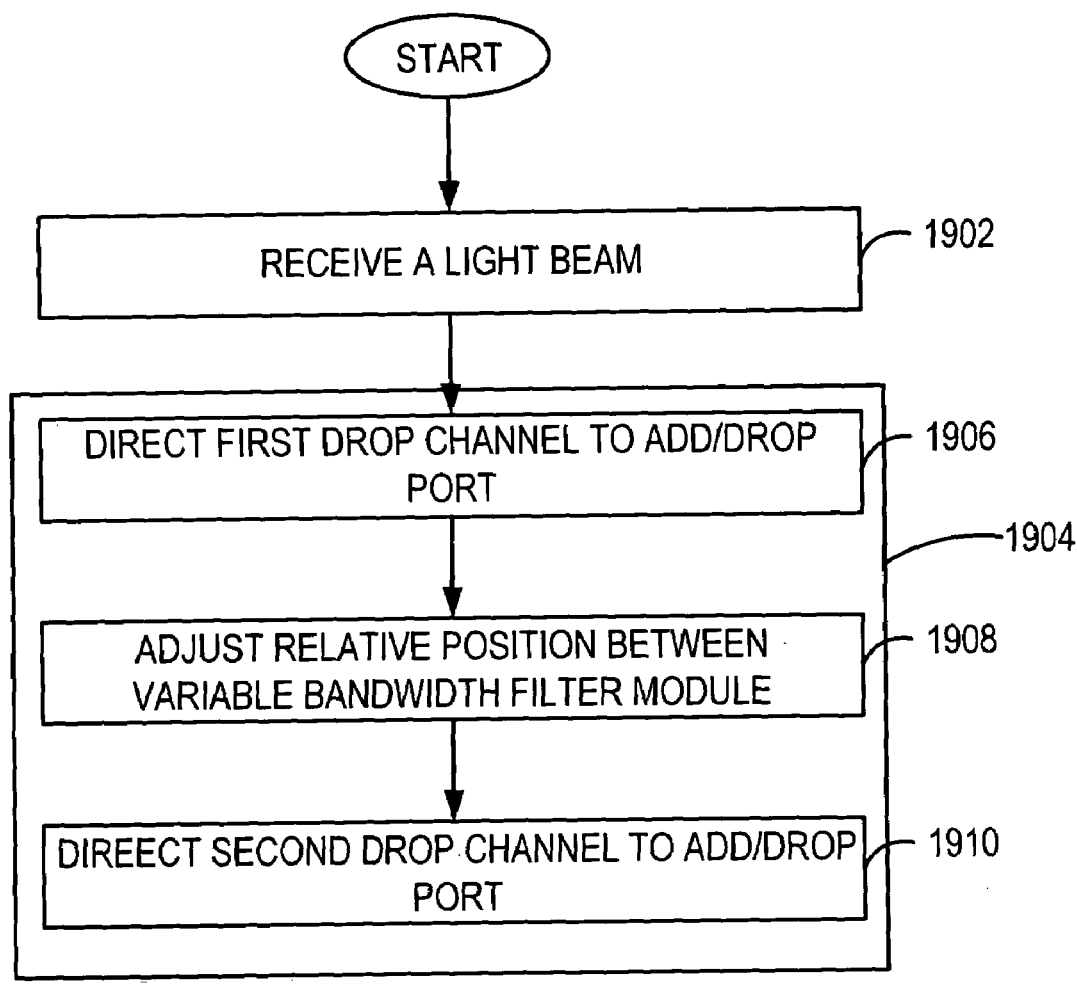
FIG. 19 is a flow chart of an exemplary method of tuning a channel selector in an add/drop node.

FIG. 19 is a flow chart of an exemplary method of tuning the channel selector 204 in a add/drop node 100. At step 1902, a light beam is received.

At step 1904, a bandwidth of an optical transfer function of the variable bandwidth filter module 1600 is selected. In one implementation of the exemplary embodiment, step 1904 includes step 1906 through step 1910.

At step 1906, the first channel is diverted to the add/drop port 106 and at least the second channel is diverted to the output port 104 when the first filter bandwidth is selected.

At step 1908, a relative position between the light beam and the variable bandwidth filter module 1600 is adjusted. In response to the channel controller 108, the adjustment mechanism 1614 adjusts the relative position between the light beam and the variable bandwidth filter module 1600 such that the bandwidth of the optical transfer function of the module 1600 is selected to be substantially the same as a channel to dropped or added to the light beam. The light beam includes at least a first channel having a first channel frequency bandwidth and a second channel having a second channel frequency bandwidth. The variable bandwidth filter module includes a plurality of filter elements where each element has an optical transfer function with a unique bandwidth. The appropriate bandwidth is selected by adjusting the relative position of the variable filter module such that a filter element with the desired bandwidth receives the light beam.

At step 1910, the second channel is diverted to the add/drop port 106 and at least the first channel is diverted to the output port 104 when the second filter bandwidth is selected.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

What is claimed is:

1. An add/drop apparatus, comprising:
   a channel selector configured to receive a plurality of channels that include a first channel and a second channel, the channel selector being configured to direct the first channel to an add/drop node and the second channel to an output node when in a first channel mode and being further configured to direct the second channel to the add/drop node and the first channel to the output node when in a second channel mode,
   the channel selector being configured such that when the channel selector is in the first channel mode, a first alternate optical channel traveling from the add/drop node to the channel selector travels from the channel selector to the output node with a different bandwidth than the first channel directed to the add/drop node by the channel selector; and
   a switch configured to receive a plurality of optical channels and to direct the optical channels such that the optical channels are received by the channel selector or such that the optical channels bypass the channel selector and are received at the output node, an optical path along which the channels travels from the switch to the channel selector being exclusive of an optical path from the channel selector to the add/drop node and also exclusive of an optical path from the channel selector to the output node.

2. The apparatus of claim 1, wherein the channel selector is configured such that a bandwidth of a channel directed to the add/drop node can be tuned.

3. The apparatus of claim 2, wherein the channel selector includes:
   a first optical filter element configured such that when the channel selector is in the first channel mode and the first optical filter element receives the first channel the first optical filter element directs the first channel to the add/drop node with a first bandwidth; and
   a second optical filter element configured such that when the channel selector is in the first channel mode and the second optical filter element receives the first channel, the second optical filter element directs the first channel to the add/drop node with a second bandwidth the second bandwidth being different from the first bandwidth.

4. The apparatus of claim 3, wherein the first optical filter element is arranged to move in conjunction with the second filter element.

5. The apparatus of claim 3, further comprising:
   an adjustment mechanism configured to position the first optical filter element and the relative to a beam in accordance with a desired optical bandwidth of a diverted signal, the beam including the plurality of channels.

6. The apparatus of claim 5, wherein the adjustment mechanism is further configured to position the first optical filter element and the relative to the beam such that the channel selector directs the desired channel to the add/drop node.

7. The apparatus of claim 1, further comprising:
a controller configured to operate the switch such that channels are directed to the output port when changing the apparatus between the first channel mode and the second channel mode.

8. The apparatus of claim 1, further comprising:
one or more second channel selectors configured to receive the plurality of channels from the switch, each of the second channel selectors configured to direct one or more of the channels to the add/drop node.

9. The apparatus of claim 8, wherein one or more of the second channel selectors is a fixed channel selector.

10. The apparatus of claim 8, further comprising:
an optical channel coupler configured to receive channels from the channel selector and from the one or more second channel selectors and to direct the received channels to the output port.

11. The apparatus of claim 1, wherein the channel selector is configured to direct a plurality of channels to the add/drop node when in the first channel mode.

12. An add/drop apparatus, comprising:
a channel selector configured to receive a plurality of channels that include a first channel and a second channel, the channel selector being configured to direct the first channel to an add/drop node and the second channel to an output node when in a first channel mode and being further configured to direct the second channel to the add/drop node and the first channel to the output node when in a second channel mode,
the channel selector including
a first optical filter element configured such that when the channel selector is in the first channel mode and the first optical filter element receives the first channel, the first optical filter element directs the first channel to the add/drop node with a first bandwidth when the channel selector first channel mode, and
a second optical filter element configured such that when the channel selector is in the first channel mode and the second optical filter element receives the first channel, the second optical filter element directs the first channel to the add/drop node with a second bandwidth, the second bandwidth being different from the first bandwidth; and
a switch configured to receive a plurality of optical channels and to direct the optical channels such that the optical channels are received by the channel selector or such that the optical channels bypass the channel selector and are received at the output node, an optical path along which the channels travels from the switch to the channel selector being exclusive of an optical path from the channel selector to the add/drop node and also exclusive of an optical path from the channel selector to the output node.

13. The apparatus of claim 12, wherein the first optical filter element is arranged to move in conjunction with the second filter element.

14. The apparatus of claim 12, further comprising:
an adjustment mechanism configured to position the first optical filter element and the relative to a beam in accordance with a desired optical bandwidth of a diverted signal, the beam including the plurality of channels.

15. The apparatus of claim 14, wherein the adjustment mechanism is further configured to position the first optical filter element and the relative to the beam such that the channel selector directs the desired channel to the add/drop node.

16. The apparatus of claim 12, further comprising:
a controller configured to operate the switch such that channels are directed to the output port when changing the apparatus between the first channel mode and the second channel mode.

17. The apparatus of claim 12, wherein:
the channel selector is configured such that a first alternate optical channel traveling from the add/drop node to the channel selector travels from the channel selector to the output node when the channel selector is in the first channel mode.

18. The apparatus of claim 17, wherein:
the channel selector is configured such that when in the first channel mode, the first alternate channel is directed to the output node with a different bandwidth than the first channel directed to the add/drop node.

19. The apparatus of claim 12, further comprising:
one or more second channel selectors configured to receive the plurality of channels from the switch, each of the second channel selectors configured to direct one or more of the channels to the add/drop node.

20. The apparatus of claim 19, wherein one or more of the second channel selectors is a fixed channel selector.

21. The apparatus of claim 19, further comprising:
an optical channel coupler configured to receive channels from the channel selector and from the one or more second channel selectors and to direct the received channels to the output port.

22. The apparatus of claim 12, wherein the channel selector is configured to direct a plurality of channels to the add/drop node when in the first channel mode.

* * * * *